United States Patent
Choi et al.

(10) Patent No.: US 9,843,440 B2
(45) Date of Patent: Dec. 12, 2017

(54) ENCRYPTOR/DECRYPTOR, ELECTRONIC DEVICE INCLUDING ENCRYPTOR/DECRYPTOR, AND METHOD OF OPERATING ENCRYPTOR/DECRYPTOR

(71) Applicant: SAMSUNG ELECTRONICS CO., LTD., Suwon-si (KR)

(72) Inventors: Hong-Mook Choi, Bucheon-si (KR); Heon-Soo Lee, Hwaseong-si (KR); Sang-hyun Park, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/790,106

(22) Filed: Jul. 2, 2015

(65) Prior Publication Data
US 2016/0112188 A1  Apr. 21, 2016

(30) Foreign Application Priority Data

Oct. 20, 2014 (KR) .................. 10-2014-0141690

(51) Int. Cl.
*H04L 9/06* (2006.01)
*G09C 1/00* (2006.01)

(52) U.S. Cl.
CPC .............. *H04L 9/0618* (2013.01); *G09C 1/00* (2013.01); *H04L 2209/125* (2013.01); *H04L 2209/24* (2013.01)

(58) Field of Classification Search
CPC ............... H04L 9/0618; H04L 2209/24; H04L 2209/125; G09C 1/00
See application file for complete search history.

(56) References Cited

U.S. PATENT DOCUMENTS

| | | | |
|---|---|---|---|
| 7,568,112 B2 | 7/2009 | Yamaguchi et al. | |
| 7,945,789 B2 | 5/2011 | Nutter et al. | |
| 8,155,306 B2 | 4/2012 | Brickell et al. | |
| 8,549,282 B2 * | 10/2013 | Sabo | H04L 63/06 380/229 |

(Continued)

FOREIGN PATENT DOCUMENTS

| | | |
|---|---|---|
| EP | 1374009 | 1/2002 |
| JP | 2004-266479 A | 9/2004 |

(Continued)

OTHER PUBLICATIONS

"The XTS-AES Tweakable Block Cipher: An Extract from IEEE Std 1619-2007", Institute of Electrical and Electronics Engineers, Apr. 2008, 24 pages total.

*Primary Examiner* — Michael Pyzocha
(74) *Attorney, Agent, or Firm* — Sughrue Mion, PLLC

(57) ABSTRACT

An encryptor/decryptor, an electronic device including the encryptor/decryptor, and a method of operating the encryptor/decryptor are provided. The method of operating the encryptor/decryptor includes distributing an input plaintext stream to a plurality of encryption/decryption cores by pieces of plaintext data; performing a first operation by a first encryption/decryption core from among the plurality of encryption/decryption cores; and encrypting the plaintext data to ciphertext data or decrypting the ciphertext data to the plaintext data by each of the plurality of encryption/decryption cores by using a result of performing the first operation in the first encryption/decryption core.

21 Claims, 37 Drawing Sheets

(56) References Cited

U.S. PATENT DOCUMENTS

| | | |
|---|---|---|
| 8,666,064 B2 | 3/2014 | Choi et al. |
| 8,681,974 B1 * | 3/2014 | Langhammer ............ G09C 1/00 380/28 |
| 9,355,279 B1 * | 5/2016 | Takahashi |
| 2003/0223581 A1 * | 12/2003 | Hanounik ............. H04L 9/0637 380/37 |
| 2008/0044025 A1 * | 2/2008 | Corndorf ............. H04L 9/0631 380/270 |
| 2008/0069339 A1 * | 3/2008 | Parveen ................. G09C 1/00 380/28 |
| 2009/0097639 A1 * | 4/2009 | Hotta ..................... G09C 1/00 380/29 |
| 2009/0147947 A1 * | 6/2009 | Ingimundarson ..... H04L 9/0643 380/29 |
| 2009/0271638 A1 | 10/2009 | Kawakami et al. |
| 2010/0061551 A1 * | 3/2010 | Jung .................... H04L 9/0631 380/44 |
| 2010/0074440 A1 * | 3/2010 | Lee ...................... H04L 9/0631 380/44 |
| 2010/0104093 A1 * | 4/2010 | Shirai .................... H04L 9/002 380/28 |
| 2010/0115286 A1 | 5/2010 | Hawkes et al. |
| 2010/0146303 A1 * | 6/2010 | Kothari .............. G06F 12/1408 713/193 |
| 2010/0153747 A1 * | 6/2010 | Asnaashari ............... H04L 9/28 713/193 |
| 2010/0202608 A1 * | 8/2010 | Furuhashi ............ H04L 9/0894 380/44 |
| 2010/0299537 A1 * | 11/2010 | Mackey .............. G06F 12/1408 713/190 |
| 2011/0013769 A1 * | 1/2011 | Itoh ......................... H04L 9/003 380/28 |
| 2011/0123020 A1 * | 5/2011 | Choi .................... H04L 9/0637 380/28 |
| 2012/0069993 A1 * | 3/2012 | Fujisaki ................ H04L 9/0637 380/28 |
| 2013/0111224 A1 * | 5/2013 | Gunnam ................. H04L 9/003 713/300 |
| 2014/0292371 A1 * | 10/2014 | Di ............................ G09C 1/00 326/95 |
| 2015/0149788 A1 * | 5/2015 | Gupta ................. G06F 12/1408 713/189 |
| 2015/0227472 A1 * | 8/2015 | Matsuo .................... G09C 1/00 713/193 |
| 2015/0261965 A1 * | 9/2015 | Brumley ................ G06F 21/602 713/193 |
| 2015/0349951 A1 * | 12/2015 | Farrugia ............... H04L 9/0631 380/28 |
| 2015/0363334 A1 * | 12/2015 | Mundra .............. G06F 12/1408 713/193 |

FOREIGN PATENT DOCUMENTS

| | | |
|---|---|---|
| JP | 3880933 B2 | 2/2007 |
| KR | 10-2005-0095168 A | 9/2005 |
| KR | 10-0546777 B1 | 1/2006 |
| KR | 10-0680025 B1 | 2/2007 |

* cited by examiner

FIG. 5

|         | Key Length | Block Size | Numbers of Rounds |
|---------|------------|------------|-------------------|
| AES-128 | 4          | 4          | 10                |
| AES-192 | 6          | 4          | 12                |
| AES-256 | 8          | 4          | 14                |

FIG. 6

Algorithm 1

```
1   Cipher(byte in[4*Nb], byte out[4*Nb], word w[Nb*(Nr+1)])
2   begin
3           byte state[4,Nb]
4
5           state = in
6
7           AddRoundKey(state, w[0, Nb-1])
8
9           for round = 1 step 1 to Nr-1
10                  SubBytes(state)
11                  ShiftRows(state)
12                  MixColumns(state)
13                  AddRoundKey(state, w[round*Nb, (round+1)*Nb-1])
14          end for
15
16      SubBytes(state)
17      ShiftRows(state)
18      AddRoundKey(state, w[Nr*Nb, (Nr+1)*Nb-1])
19
20      out = state
21
22  end
```

ENCRYPTOR/DECRYPTOR, ELECTRONIC DEVICE INCLUDING ENCRYPTOR/DECRYPTOR, AND METHOD OF OPERATING ENCRYPTOR/DECRYPTOR

CROSS-REFERENCE TO RELATED APPLICATIONS

This application claims the benefit of Korean Patent Application No. 10-2014-0141690, filed on 20 Oct. 2014, in the Korean Intellectual Property Office, the disclosure of which is incorporated by reference herein in its entirety.

BACKGROUND

1. Field

Methods, devices, apparatuses, and articles of manufacture consistent with the present disclosure relate to an encryptor/decryptor, an electronic device including the encryptor/decryptor, and a method of operating the encryptor/decryptor, and more particularly, to an encryptor/decryptor capable of using resources efficiently while processing encryption/decryption of data at high speed, an electronic device including the encryptor/decryptor, and a method of operating the encryptor/decryptor.

2. Description of the Related Art

As high capacity data such as multimedia content increases, there is a corresponding need to increase the speed of processing the high capacity data. Moreover, encryption for storing or transmitting data safely has become prominent.

SUMMARY

It is an aspect to provide an encryptor/decryptor capable of using resources efficiently while processing encryption/decryption of data at high speed, an electronic device including the encryptor/decryptor, and a method of operating the encryptor/decryptor.

According to an aspect of an exemplary embodiment, there is provided a method of operating an encryptor/decryptor, the method including distributing an input plaintext stream to a plurality of encryption/decryption cores by pieces of plaintext data; performing a first operation in a first encryption/decryption core from among the plurality of encryption/decryption cores; and encrypting the plaintext data to ciphertext data or decrypting the ciphertext data to the plaintext data in each of the plurality of encryption/decryption cores by using a result of performing the first operation in the first encryption/decryption core.

According to another aspect of an exemplary embodiment, there is provided an encryptor/decryptor comprising a plurality of encryption/decryption cores, each performing encryption or decryption through a plurality of rounds according to a block cipher algorithm; and a first data processor for distributing an input plaintext stream to the plurality of encryption/decryption cores by pieces of plaintext data, wherein each of the plurality of encryption/decryption cores encrypts the plaintext data to ciphertext data or decrypts the ciphertext data to the plaintext data by using a result of a first operation that is performed by a first encryption/decryption core from among the plurality of encryption/decryption cores.

According to another aspect of an exemplary embodiment, there is provided an electronic device comprising a system on chip (SOC) executing an application; and a flash memory system electrically connected to the SOC and storing data used in the SOC, wherein the SOC comprises a plurality of encryption/decryption cores, each performing encryption or decryption through a plurality of rounds according to a block cipher algorithm; and a first data processor that is configured to distribute a plaintext stream input from the flash memory system to the plurality of encryption/decryption cores by pieces of plaintext data, wherein each of the plurality of encryption/decryption cores encrypts the plaintext data to ciphertext data or decrypts the ciphertext data to the plaintext data by using a result of a first operation that is performed by a first encryption/decryption core from among the plurality of encryption/decryption cores.

According to another aspect of an exemplary embodiment, there is provided a method of operating an encryptor/decryptor, the method comprising distributing plaintext data to a plurality of encryption/decryption cores; performing encryption of the plaintext data according to a block encryption algorithm in a first encryption/decryption core from among the plurality of encryption/decryption cores to generate a final round key of the block encryption algorithm; and sharing the final round key with one or more of the plurality of encryption/decryption cores other than the first encryption/decryption core.

BRIEF DESCRIPTION OF THE DRAWINGS

Exemplary embodiments of the inventive concept will be more clearly understood from the following detailed description taken in conjunction with the accompanying drawings in which:

FIG. 5 is a table representing a number of rounds according to a size of a cipher key of FIG. 4;

FIG. 6 is an example of pseudo-code for implementing the encryption algorithm of FIG. 4;

DETAILED DESCRIPTION OF EXEMPLARY EMBODIMENTS

Figure 1:
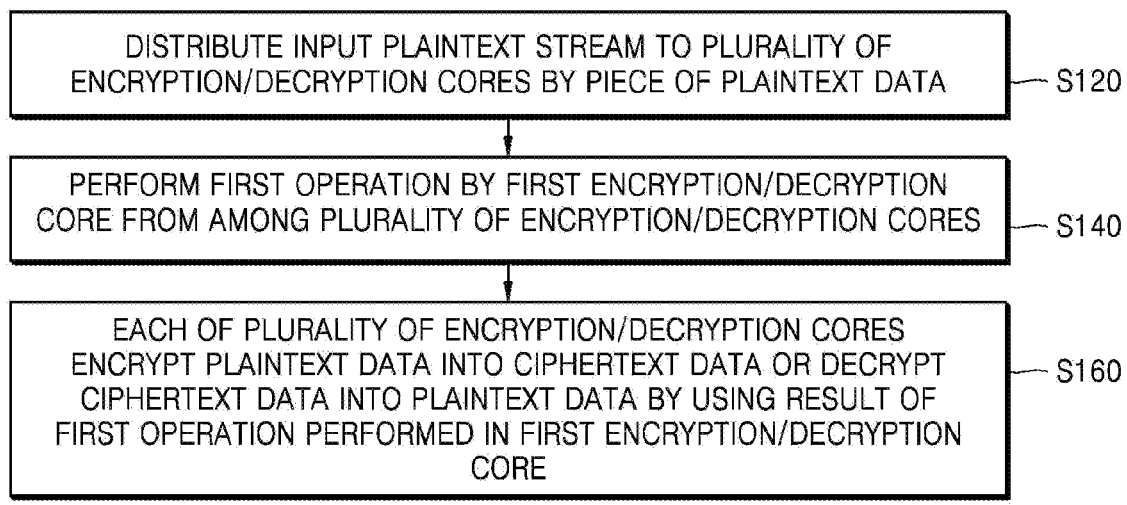
FIG. 1 is a flowchart of a method of operating an encryptor/decryptor according to an exemplary embodiment of the inventive concept.

The attached drawings for illustrating exemplary embodiments are referred to in order to gain a sufficient understanding, the merits thereof, and the objectives accomplished by the implementation. Hereinafter, the inventive concept will be described in detail by explaining exemplary embodiments of the inventive concept with reference to the attached drawings. Like reference numerals in the drawings denote like elements. As used herein, the term "and/or" includes any and all combinations of one or more of the associated listed items. Expressions such as "at least one of," when preceding a list of elements, modify the entire list of elements and do not modify the individual elements of the list.

FIG. 1 is a flowchart of a method of operating an encryptor/decryptor according to an exemplary embodiment of the inventive concept. Referring to FIG. 1, the method of operating the encryptor/decryptor according to the present exemplary embodiment includes distributing an input plaintext stream to a plurality of encryption/decryption cores according to pieces of plaintext data (S120), performing a first operation in a first encryption/decryption core from among the plurality of encryption/decryption cores (S140), encrypting the plaintext data to ciphertext data, or decrypting ciphertext data to plaintext data, by each of the plurality of encryption/decryption cores by using a result of the first operation performed in the first encryption/decryption core (S160).

Figure 2:
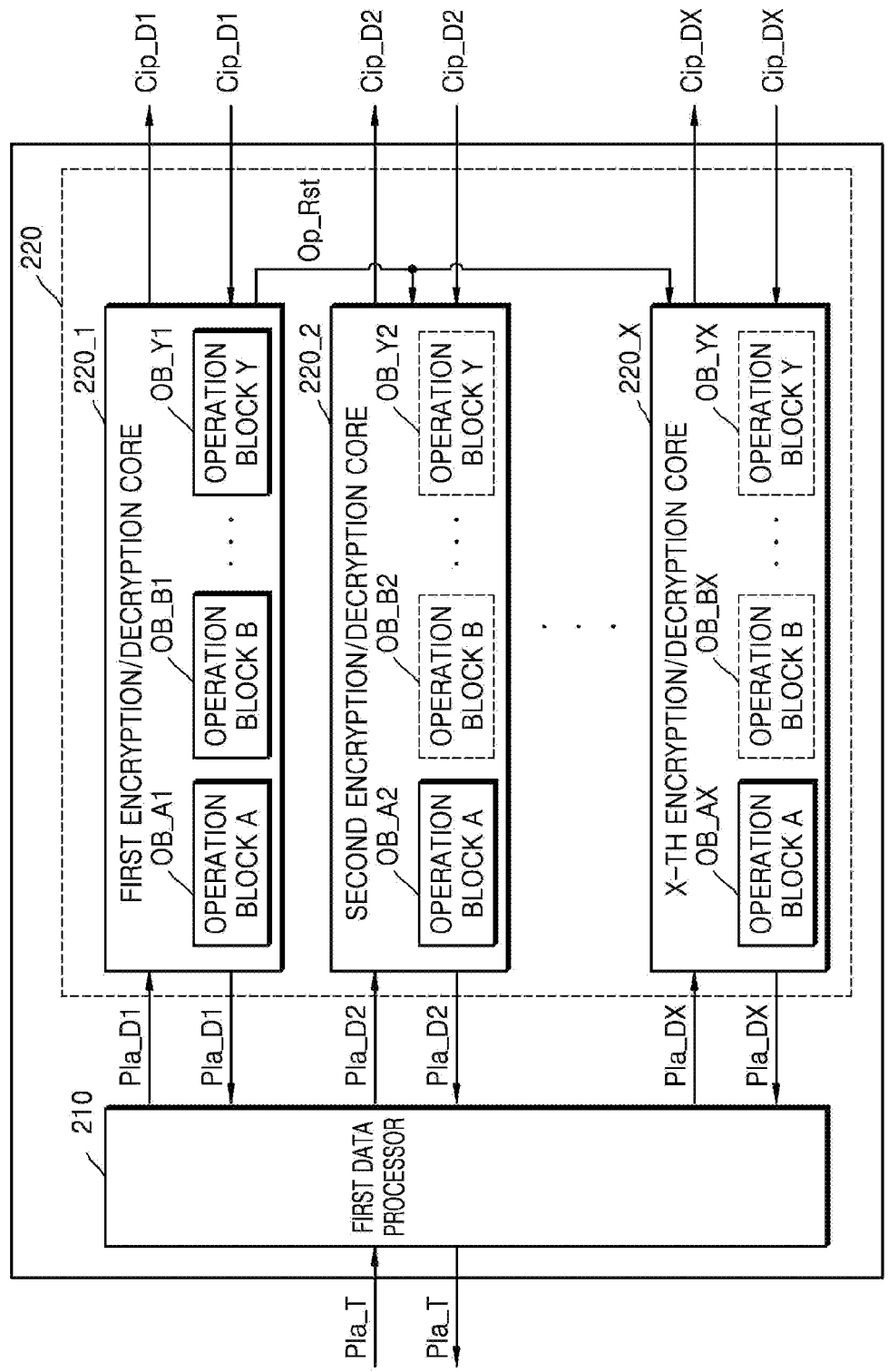
FIG. 2 is a diagram of an example of a structure of an encryptor/decryptor according to an exemplary embodiment of the inventive concept.

The first operation performed by the first encryption/decryption core may be generation of a round key or an initialization operation of an xor-encrypt-xor (XEX)-based tweaked-codebook mode with ciphertext stealing (XTS). Operation S160, in which each of the plurality of encryption/decryption cores encrypts the plaintext data to the ciphertext data, or decrypts the ciphertext data to the plaintext data, may be performed simultaneously or sequentially by the plurality of encryption/decryption cores. The operations of the method illustrated in FIG. 1 may be performed by an encryptor/decryptor of FIG. 2. FIG. 2 is a diagram of an encryptor/decryptor according to an exemplary embodiment of the inventive concept. Referring to FIGS. 1 and 2, an encryptor/decryptor 200 includes a first data processor 210 and an encryption/decryption core module 220. The encryption/decryption core module 220 includes the plurality of encryption/decryption cores 220_1, 220_2, . . . , 220_X.

The first data processor 210 divides an input plaintext stream Pla_T into a plurality of pieces of plaintext data Pla_D1, Pla_D2, . . . , Pla_DX, and distributes the plurality of pieces of plaintext data Pla_D1, Pla_D2, . . . , Pla_DX to the plurality of encryption/decryption cores 220_1, 220_2, . . . , 220_X of the encryption/decryption core module 220 (S120). The plaintext stream Pla_T may be input via a bus connected to the encryptor/decryptor 200. The bus may transmit data in a unit of regulated size. That is, each piece of data may be of a same size. Therefore, the plaintext stream Pla_T may be transmitted to the encryptor/decryptor 200 continuously in a size regulated by a bus interface.

The first data processor 210 may divide the plaintext stream Pla_T into pieces of the plaintext data Pla_D1, Pla_D2, . . . , Pla_DX. For example, the first data processor 210 may divide the plaintext stream Pla_T into X plaintext data Pla_D1, Pla_D2, . . . , Pla_DX (where X is an integer and X≥2), each having a size. For example, the size may be 128 bits. As described above, in a case where the size of the plaintext data is 128-bit, a piece of data in the plaintext data Pla_T transmitted via the bus is 128 bits, and the piece of data is directly distributed to one of the encryption/decryption cores 220_1, 220_2, . . . , 220_X as the plaintext data. If a piece of data in the plaintext stream Pla_T transmitted via the bus is less than or greater than 128 bits, the piece of data may be assembled or partitioned as the plaintext data of 128 bits and then distributed to one of the plurality of encryption/decryption cores 220_1, 220_2, . . . , 220_X. The first data processor 210 may distribute the plaintext data Pla_D1, Pla_D2, . . . , Pla_DX simultaneously or sequentially to the encryption/decryption cores 220_1, 220_2, . . . , 220_X.

The first data processor 210 may provide X encryption/decryption cores 220_1, 220_2, . . . , 220_X with X plaintext data Pla_D1, Pla_D2, . . . , Pla_DX. For example, first plaintext data Pla_D1 is provided to the first encryption/decryption core 220_1, and second plaintext data Pla_D2 may be provided to the second encryption/decryption core 220_2. Likewise, X-th plaintext data Pla_DX may be provided to the X-th encryption/decryption core 220_X. If the plaintext stream Pla_T include X or more plaintext data, the first data processor 210 provides the X plaintext data Pla_D1, Pla_D2, . . . , Pla_DX respectively to the X encryption/decryption cores 220_1, 220_2, . . . , 220_X, and then, may provide plaintext data that has not yet been processed to an encryption/decryption core that has finished the encryption operation. For example, there may be X encryption/decryption cores 220_1, 220_2, . . . , 220_X with Y plaintext data Pla_D1, Pla_D2, . . . , Pla_DY, where Y>X. In this case, plaintext data Pla_D(X+1) may be provided to an encryption/decryption core that has finished the encryption operation. So, for example, if the second encryption/decryption core 220_2 has finished encrypting plaintext data Pla_D2, the first data processor 210 may provide the next plaintext data Pla_D(X+1) to the second encryption/decryption core 220_2. Alternatively, if the first encryption/decryption core 220_1 has finished encrypting plaintext data Pla_D1, the first data processor 210 may provide the next plaintext data Pla_D(X+1) to the first encryption/decryption core 220_1, etc.

The first data processor 210 may also receive a plurality of pieces of plaintext data Pla_D1, Pla_D2, . . . , Pla_DX from the plurality of encryption/decryption cores 220_1, 220_2, . . . , 220_X. In this case, the first data processor 210 may output the plurality of pieces of the plaintext data Pla_D1, Pla_D2, . . . , Pla_DX provided from the plurality of encryption/decryption cores 220_1, 220_2, . . . , 220_X as the plaintext stream Pla_T. As described above, the plaintext stream Pla_T may be output sequentially in a size regulated by the bus interface.

When the plaintext stream Pla_T that is input to the first data processor 210 is divided by the first data processor 210 into the plurality pieces of plaintext data, a header of each piece of the plaintext data may include information about the division, for example, information about an order of the plaintext data within the plaintext stream. In addition, in a similar manner, a header of the ciphertext data encrypted from the plaintext data and a header of the plaintext data decrypted from the ciphertext data may also include the above information. The first data processor 210 may output the plaintext stream Pla_T sequentially with reference to the headers of the input plaintext data Pla_D1, Pla_D2, . . . , Pla_DX.

The plurality of pieces of plaintext data Pla_D1, Pla_D2, . . . , Pla_DX provided from the plurality of encryption/decryption cores 220_1, 220_2, . . . , 220_X to the first data processor 210 are data that has been decrypted by the plurality of encryption/decryption cores 220_1, 220_2, . . . , 220_X.

The first data processor 210 may be located at an outside of the encryptor/decryptor 200. In this case, the plaintext data Pla_D1, Pla_D2, . . . , Pla_DX input to the plurality of encryption/decryption cores 220_1, 220_2, . . . , 220_X may be input from the outside of the encryptor/decryptor 200. Similarly, the plaintext data Pla_D1, Pla_D2, . . . , Pla_DX output from the plurality of encryption/decryption cores 220_1, 220_2, . . . , 220_X may be output to the outside of the encryptor/decryptor 200.

Each of the plurality of encryption/decryption cores 220_1, 220_2, . . . , 220_X may encrypt the input plaintext data from among the plurality of pieces of the plaintext data Pla_D1, Pla_D2, . . . , Pla_DX to generate the ciphertext data (S160). For example, the first encryption/decryption core 220_1 may encrypt the first plaintext data Pla_D1 into first ciphertext data Cip_D1, and the second encryption/decryption core 220_2 may encrypt the second plaintext data Pla_D2 into second ciphertext data Cip_D2. Likewise, the X-th encryption/decryption core 220_X may encrypt the X-th plaintext data Pla_DX into X-th ciphertext data Cip_DX.

Figure 15:
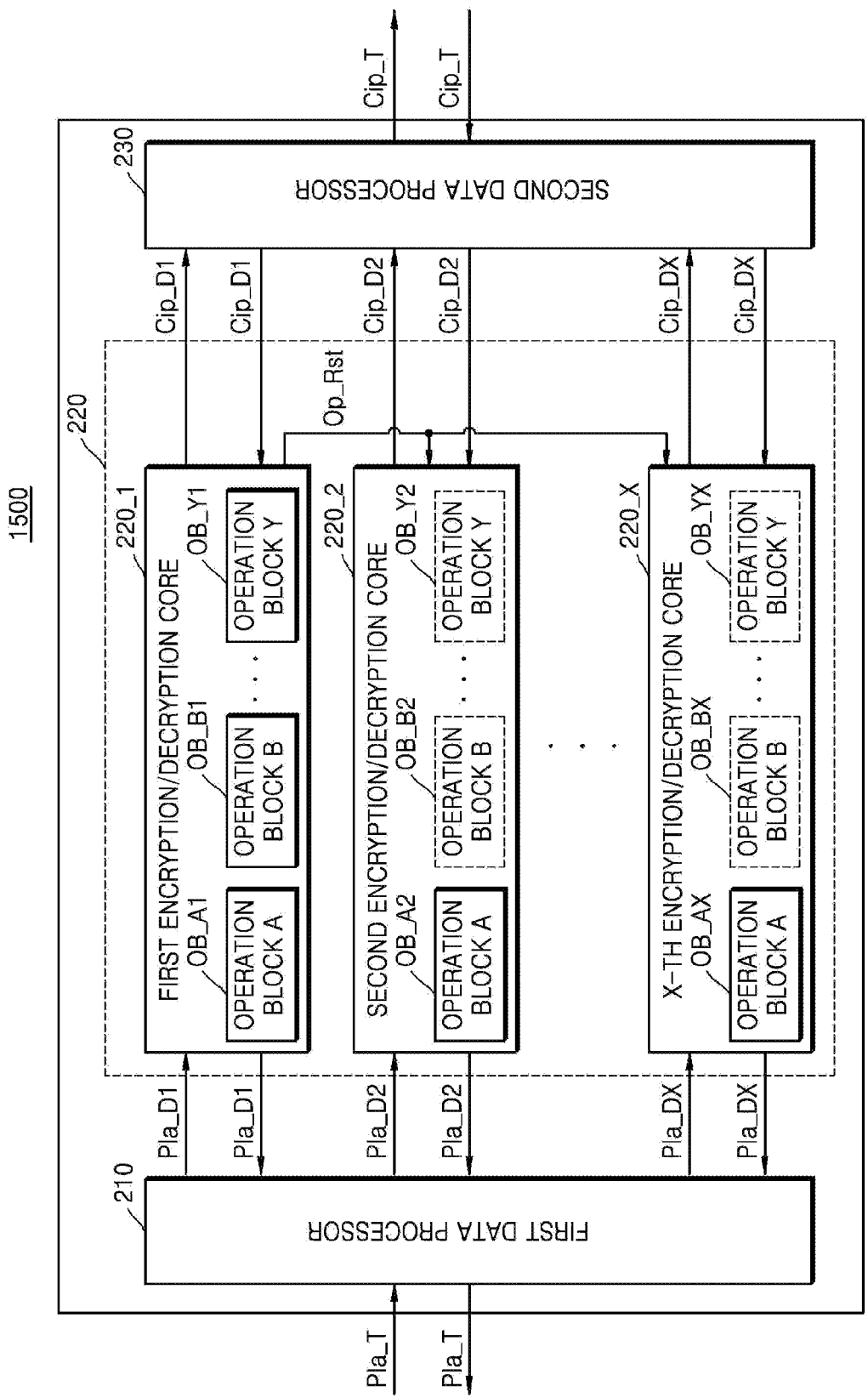
FIGS. 15 to 18 are diagrams of encryptors/decryptors according to one or more exemplary embodiments of the inventive concept.

As described above, the encryptor/decryptor 200 according to the present exemplary embodiment encrypts the plaintext stream Pla_T by using the plurality of encryption/decryption cores 220_1, 220_2, . . . , 220_X in parallel, so as to perform the encryption at a high speed. The plurality pieces of the ciphertext data Cip_D1, Cip_D2, . . . , Cip_DX generated by the plurality of encryption/decryption cores 220_1, 220_2, . . . , 220_X may be stored in a storage device (not shown) that may be electrically connected to the encryptor/decryptor 200, or may be transmitted to an outside of an electronic device (not shown) including the encryptor/decryptor 200 via a communication driver (not shown) electrically connected to the encryptor/decryptor 200. FIG. 2 shows that the ciphertext data Cip_D1, Cip_D2, . . . , Cip_DX are output in parallel from the encryptor/decryptor 200, but the inventive concept is not limited thereto. In other exemplary embodiments, some portion or all of the ciphertext data Cip_D1, Cip_D2, . . . , Cip_DX may be output sequentially from the encryptor/decryptor 200. For example, as shown in FIG. 15 that will be described later, the plurality pieces of ciphertext data Cip_D1, Cip_D2, . . . , Cip_DX may be sequentially output from the encryptor/decryptor 200, and this will be applied to other encryption/decryption cores or encryption cores according to other exemplary embodiments that will be described below.

The plurality pieces of ciphertext data Cip_D1, Cip_D2, . . . , Cip_DX input to the plurality of encryption/decryption cores 220_1, 220_2, . . . , 220_X may be input from the outside of the encryptor/decryptor 200 as shown in FIG. 2, for example, from a storage device (not shown) that may be electrically connected to the encryptor/decryptor 200, or from an outside of an electronic device (not shown) including the encryptor/decryptor 200 via a communication driver (not shown) that may be electrically connected to the encryptor/decryptor 200. A ciphertext stream input through a bus connected to the storage device, or through the communication driver that may be electrically connected to the encryptor/decryptor 200 may be distributed to the plurality of encryption/decryption cores 220_1, 220_2, . . . , 220_X as a plurality pieces of ciphertext data Cip_D1, Cip_D2, . . . , Cip_DX. The plurality pieces of ciphertext data Cip_D1, Cip_D2, . . . , Cip_DX may be input to the encryption/decryption cores. This will be described according to other exemplary embodiments below.

When the ciphertext data Cip_D1, Cip_D2, . . . , Cip_DX is applied to the plurality of encryption/decryption cores 220_1, 220_2, . . . , 220_X, each of the plurality of encryption/decryption cores 220_1, 220_2, . . . , 220_X may decrypt the input ciphertext data from among the plurality pieces of the ciphertext data Cip_D1, Cip_D2, . . . , Cip_DX into the plaintext data (S160). For example, the first encryption/decryption core 220_1 may decrypt the first ciphertext data Cip_D1 to the first plaintext data Pla_D1, and the second encryption/decryption core 220_2 may decrypt the second ciphertext data Cip_D2 into the second plaintext data Pla_D2. Likewise, the X-th encryption/decryption core 220_X may decrypt the X-th ciphertext data Cip_DX into the X-th plaintext data Pla_DX. However, as described above, the number of pieces of the plaintext data may be different than the number of the encryption/decryption cores. Also, similarly, the number of pieces of the ciphertext data may be different than the number of the encryption/decryption cores. As described above, the encryptor/decryptor 200 according to the present exemplary embodiment may perform the decryption operation in parallel by using the plurality of encryption/decryption cores 220_1, 220_2, . . . , 220_X so as to perform the decryption at a high speed.

Each of the plurality of encryption/decryption cores 220_1, 220_2, . . . , 220_X may perform the encryption or decryption by using a block cipher algorithm for performing the encryption or decryption in a block unit. That is, the encryption or decryption may be performed block by block. For example, each of the plurality of encryption/decryption cores 220_1, 220_2, . . . , 220_X may perform the encryption or decryption by using the block cipher algorithm such as data encryption standard (DES), 3DES, advanced encryption standard (AES), or SEED. The block cipher algorithm is different from a stream cipher algorithm such as a linear feedback shift register (LFSR) that performs encryption in a bit unit, i.e., bit by bit.

Each of the plurality of encryption/decryption cores 220_1, 220_2, . . . , 220_X according to the present exemplary embodiment may perform the encryption or decryption by executing two or more operations. One of the two or more operations may be performing an encryption calculation or a decryption calculation. Another one of the two or more operations may be generating a round key that is used to perform the encryption calculation or the decryption calculation. Yet another one of the two or more operations may be an initialization operation performed before the encryption or decryption calculation. These three operations are only examples, and additional operations or operations different than these three operations may be performed. In other words, the plurality of encryption/decryption cores 220_1, 220_2, . . . , 220_X may further execute operations used for the encryption or decryption. Each of the operations will be described later.

The two or more operations may be performed by operation blocks included in the encryption/decryption cores 220_1, 220_2, . . . , 220_X. FIG. 2 shows an example, in which the encryption/decryption core 220_1 includes Y operation blocks (Y is an integer and Y≥2) OB_A1, OB_B1, . . . , OB_Y1, and the encryption/decryption cores 220_2, . . . , 220_X include operation blocks A OB_A2, . . . , OB_AX, respectively. However, as shown by the dotted lines in FIG. 2, in some exemplary embodiments each of the encryption/decryption cores 220_1, 220_2, . . . , 220_X may include Y operation blocks A (where Y is an integer and Y≥2).

The operation blocks perform the two or more operations described above. For example, operation blocks A OB_A1, OB_A2, . . . , OB_AX of the respective encryption/decryption cores 220_1, 220_2, . . . , 220_X may perform the above described encryption calculation or the above described decryption calculation. Also, operation blocks B OB_B1, OB_B2, . . . , OB_BX of the respective encryption/decryption cores 220_1, 220_2, . . . , 220_X may perform the above operation of generating the round key. Each of the operation blocks may be realized as hardware, software, or a combination thereof.

However, as discussed above some of the operation blocks in the encryption/decryption cores of FIG. 2 are denoted by dashed lines, some of the operation blocks in some of the encryption/decryption cores may be omitted or may perform only some of the operations. For example, the second encryption/decryption core 220_2 may omit the operation block B OB_B2, or the operation block B OB_B2 may perform only some of the operations thereof. For example, the operation block B OB_B2 of the second encryption/decryption core 220_2 may generate only some of a plurality of round keys that are used to perform the decryption calculation of the operation block A OB_A2. In this case, the operation block B OB_B1 of the first encryption/decryption core 220_1 may generate the round key (S140), and the second encryption/decryption core 220_2 may use the round key generated by the operation block B OB_B1 of the first encryption/decryption core 220_1 when decrypting the second ciphertext data Cip_D2 into the second plaintext data Pla_D2 (S160). Detailed examples of the operation block will be described later. First, the operation block A performing the encryption or decryption will be described below.

Figure 3:
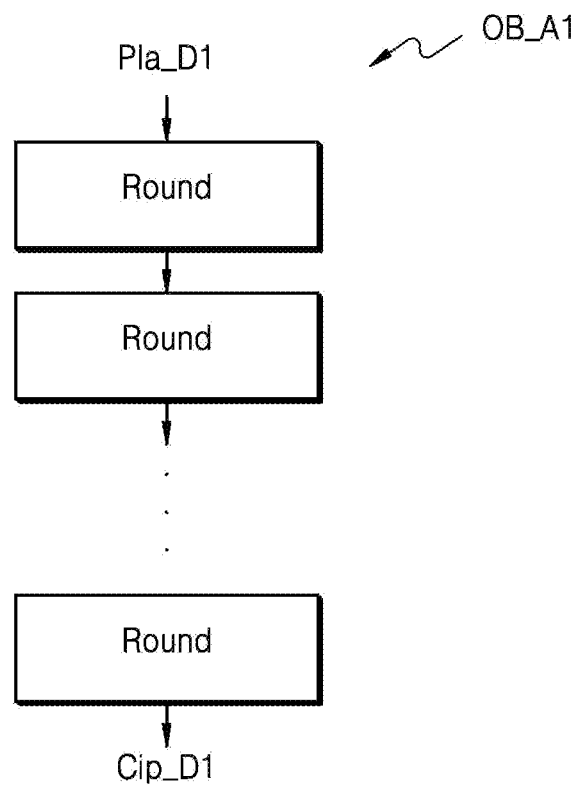
FIG. 3 is a diagram showing an example of an operation block A in a first encryption/decryption core of the encryptor/decryptor of FIG. 2.

FIG. 3 is a diagram showing an example of an operation block A of a first encryption/decryption core of the encryptor/decryptor of FIG. 2. Referring to FIGS. 2 and 3, an operation block A OB_A1 of the first encryption/decryption core 220_1 performs the encryption calculation of the first plaintext data Pla_D1 through a plurality of rounds to encrypt the first plaintext data Pla_D1 into the first ciphertext data Cip_D1. In the present specification, data applied from one round to next round, or data input into or output from each round, may be referred to as a "data block" or a "block." Therefore, the first plaintext data Pla_D1 and the first ciphertext data Cip_D1 may be also referred to as a "data block" or a "block." In each round, detailed encryption calculation may vary depending on an encryption algorithm used.

Figure 4:
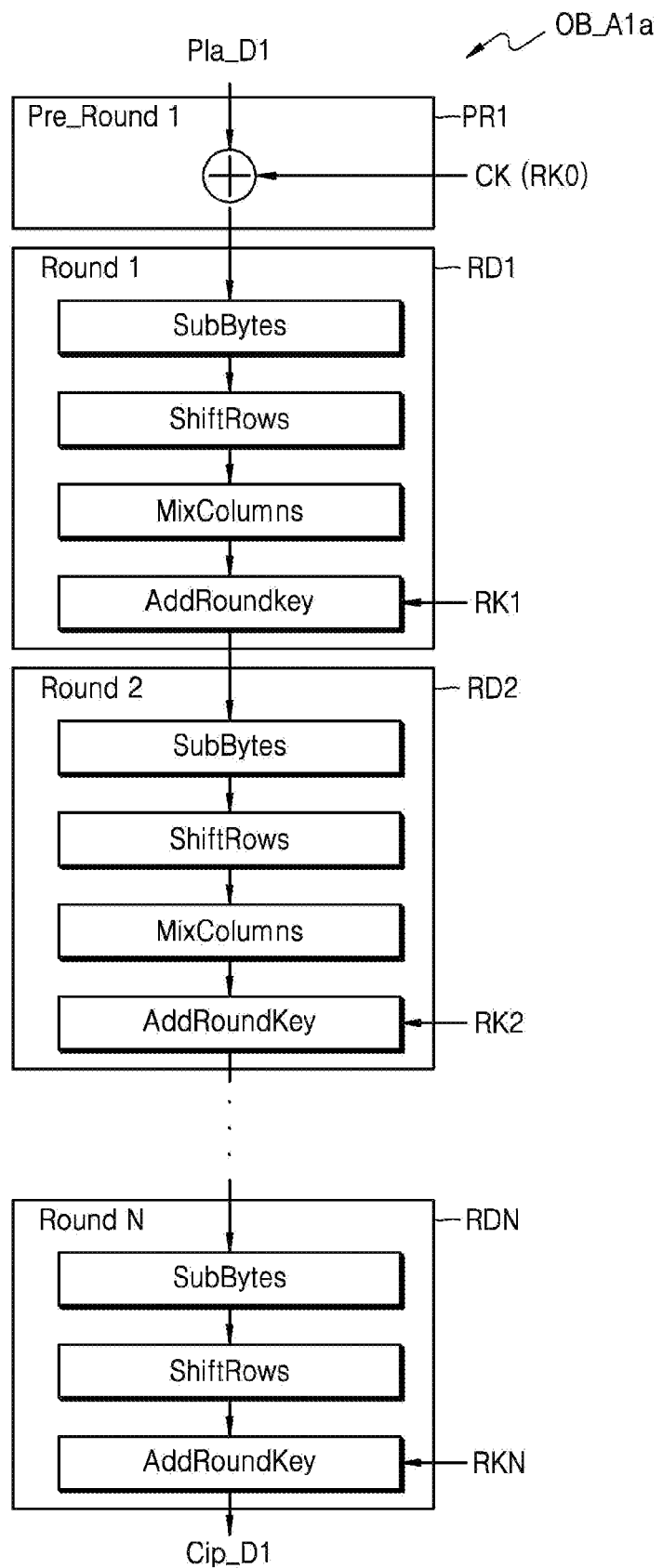
FIG. 4 is a diagram of an encryption operation performed by the operation block A of FIG. 3 according to an advanced encryption standard (AES) algorithm.

FIG. 4 is a diagram showing an example in which the operation block A of FIG. 3 performs encryption by using an advanced encryption standard (AES) algorithm. The operation block A OB_A1a of FIG. 4 may be realized by one pre-round 1 PR1 and N rounds RD1, RD2, . . . , RDN. The first pre-round PR1 performs an exclusive OR operation of the first plaintext data Pla_D1 and a cipher key. A key input to the first pre-round PR1 of FIG. 4 may be referred to as a round key and, as will be described later, the round key input to the first pre-round PR1 may be equal to the cipher key CK, and thus may be referred to as the cipher key CK. Also, the exclusive OR operation in the first pre-round PR1 is equal to a calculation AddRoundKey( ) that will be described later.

Each of the N rounds RD1 to RDN may confuse or diffuse a result of an encryption calculation in the previous round (or the first pre-round), and then, may perform an exclusive OR operation of the confusion or diffusion result with round keys RK1 to RKN that are exclusive to the rounds. The confusion makes relation between the data blocks of successive rounds confused, and the diffusion denotes diffusing a pattern of the data block.

In FIG. 4, the first plaintext data Pla_D1 is of a certain size. For example, the size may be 128 bits. With respect to cases where the cipher key CK has 128 bits, 192 bits, and 256 bits, the AES may be referred to respectively as AES-128, AES-192, and AES-256. The number of rounds may vary depending on the size of the cipher key CK.

FIG. 5 is a table representing a number of rounds according to a size of a cipher key CK. Referring to FIGS. 4 and 5, in a case of AES-128, the cipher key CK is four words, that is, 128 bits, and 10 rounds exist. In addition, in a case of AES-192 and AES-256, the cipher key CK has six words and eight words, respectively, and there are 12 rounds and 14 rounds, respectively. It should be noted that the first pre-round PR1 of FIG. 4 is not added to the number of rounds. The sizes of blocks, that is, the first plaintext data Pla_D1, in AES-128, AES-192, and AES-256 are equal to each other, that is, 128 bits, while the size of the cipher key varies.

Referring back to FIG. 4, each of the rounds RD1 to RDN sequentially performs four kinds of calculations, that is, SubBytes( ), ShiftRows( ), MixColumns( ), and AddRoundKey( ), for performing the above operations. However, the last round, that is, the round N RDN does not perform the calculation MixColumns( ). The calculation SubBytes( ) scrambles bytes in the data block, so that the encrypted result (that is, the first ciphertext data Cip_D1) does not have a linear structure. As described above, the data block has 128 bits, and may be represented by a 4×4 matrix having a value of byte size as an element. The calculation SubBytes( ) may be performed by representing each byte in the data block as a polynomial expression on a Galois field of $GF(2^8)$ to obtain a reciprocal number, and performing affine transformation on GF(2). The calculation ShiftRows( ) may be performed by shifting each row as much as a certain number. The certain number may be predetermined. The calculation MixColumns( ) mixes elements in each column of the data block. Each column in the data block is expressed as a third-degree polynomial having four clauses, and then multiplied with a polynomial (mod x^4+1) to be expressed as a matrix multiplication to perform the calculation MixColumns( ). By performing the calculations SubBytes( ), ShiftRows( ), and MixColumns( ), the confusion and diffusion with respect to the data block are performed. The calculation AddRoundKey( ) is performed by performing an exclusive OR operation of the elements (bytes) of the data block with the round key.

The above operations may be expressed as an algorithm, an example of which is shown in pseudo-code in FIG. 6. In an algorithm 1 of FIG. 6, Nb and Nr respectively denote a size of the data block (in a unit of words) and the number of rounds, and w[ ] denotes a value of the round key. For example, Nb may be 4, and Nr may vary depending on the magnitude of the cipher key. Hereinafter, an example of AES-128 will be described for convenience of description. In this case, the cipher key CK is 128 bits. The cipher key CK may have a value of, for example, {2b 7e 15 16 28 ae d2 a6 ab f7 15 88 09 cf 4f 3c}.

In the algorithm 1, the data block is written as the state. In the example of FIG. 4, when the first plaintext data Pla_D1 is input to the first pre-round PR1 (row 5 in FIG. 6), as described above, an exclusive OR operation of the first plaintext data Pla_D1 with the round key RK0 is performed. That is, the calculation AddRoundKey( ) is performed with respect to the first plaintext data Pla_D1 and the round key RK0 (row 7 in FIG. 6). In w[0, Nb−1] of the row 7 according to the algorithm 1, Nb is 4, and thus, the round key RK0 may be represented as w[0, 3]. With respect to the cipher key CK, in w[0, 3], w0=2b7e1516, w1=28aed2a6 w2, =abf71588, and w3=09cf4f3c. That is, w[0, 3], that is, the value of the round key RK0 that is AddRoundKey calculated with the first plaintext data Pla_D1, is equal to the cipher key CK.

From round 1 to round 9, four kinds of calculations SubBytes( ), ShiftRows( ), MixColumns( ), and AddRoundKey( ) are sequentially performed with respect to the data blocks (row 9 to row 14 in FIG. 6). With respect to the round 10, that is, the last round in this example, three calculations SubBytes( ), ShiftRows( ), and AddRoundKey( ), except for the calculation MixColumns( ) are sequentially performed (row 16 to row 18 in FIG. 6). In the round 10, the round key w[40, 43] is used.

Each round key with respect to the example of the cipher key CK described above is exemplarily shown in table A.1 of Appendix A of the document "Specification for the ADVANCED ENCRYPTION STANDARD (AES)" of the Federal Information Processing Standards Publication 197 (FIPS-197) published by the National Institute of Standards and Technology (NIST) on Nov. 26, 2001, which is herein incorporated by reference. In AES-128, the round key generated in the previous round is expanded to generate the round key of the next round. From the round key RK1, each word forming each round key is obtained from following Equation 1.

if($i$ mod 4=0)$w_i = t \oplus w_{i-4}$ else $w_i = w_{i-1} \oplus w_{i-4}$ $t = \text{SubWord}(\text{RotWord}(w_{i-1})) \oplus R\text{Con}_{i/4}$ \hfill (1)

In above Equation 1, RotWord denotes a function for circulating the word, that is, moving each byte to the left by one byte within a word configured by four bytes. For example, RotWord changes a word [a0, a1, a2, a3] configured by bytes a0, a1, a2, and a3 into [a1, a2, a3, a0]. Subword denotes a function that is similar to the calculation SubBytes( ), but is applied to only four bytes. RCon denotes a round constant having four bytes. Therefore, an N-th round key (final round key) RKN used in the final round RDN outputting the first ciphertext data Cip_D1 is generated only when the other round keys are all calculated. Each of the round keys may be generated by the operation block B OB_B1 of FIG. 2 and may be applied to the operation A OB_A1.

Figure 7:
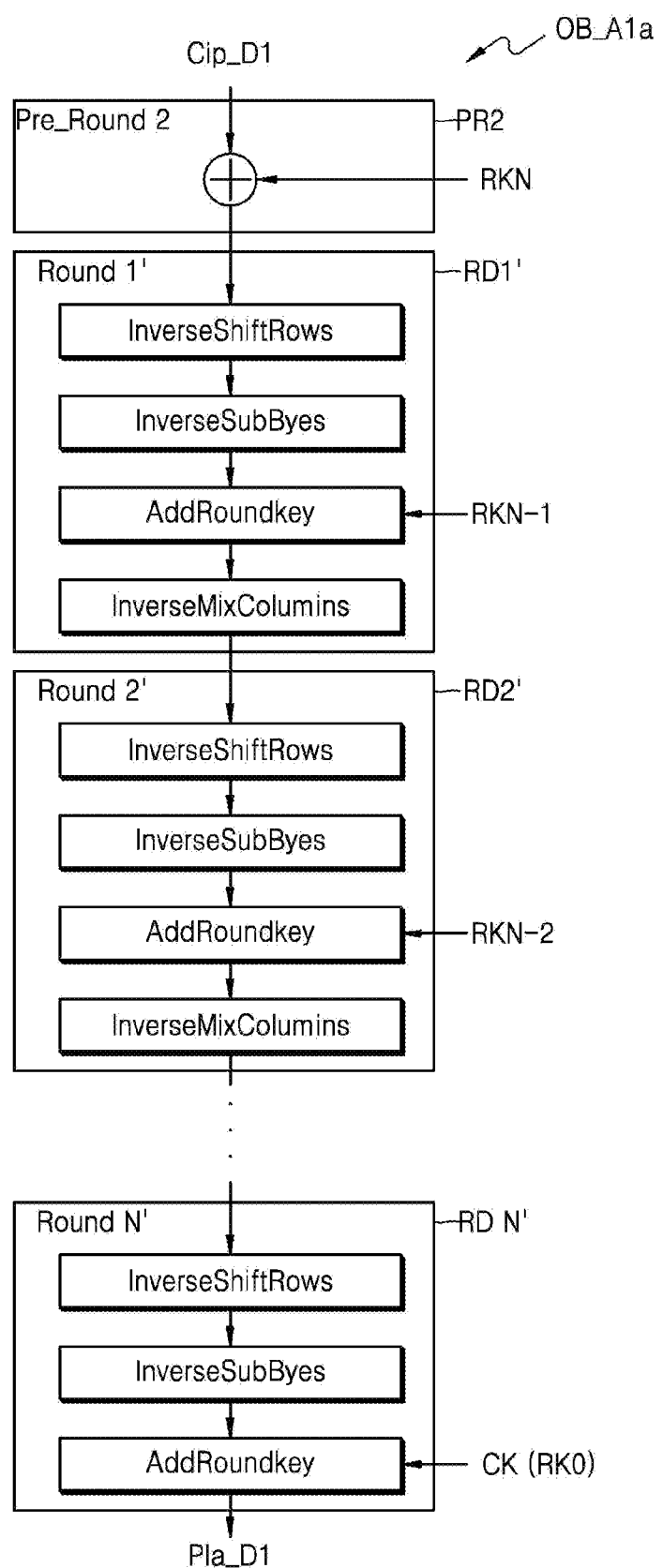
FIG. 7 is a diagram of a decryption operation performed by the operation block A of FIG. 3 according to the AES algorithm.

FIG. 7 is a diagram showing an example of performing decryption by the operation A of FIG. 3 using the AES algorithm. Referring to FIG. 7, the encryption operation of FIG. 4 is performed in a reverse order to perform the decryption in the operation block A OB_A1a. Therefore, when the first ciphertext data Cip_D1 is input to a second pre-round PR2, an exclusive OR (or AddRoundKey( )) operation is performed with the first ciphertext data Cip_D1 and the N-th round key RDK of the final round RDN that outputs the first ciphertext data Cip_D1 in the encryption operation of FIG. 4. In the example of AES-128, in which the final round is 10, the N-th round key RKN of w[40, 43] is input to the second pre-round PR2. As described above, since the N-th round key RKN may be calculated only after all round keys of the previous rounds are calculated, generation of the N-th round key RKN is a time and power consuming operation.

In addition, from round RD1' to the round immediately prior to a final round RDN' of FIG. 7, four kinds of calculations InverseShiftRows( ), InverseSubBytes( ), AddRoundKey( ), and IverseMixColumns( ) are sequentially performed with respect to the data block input to each round. In addition, in the final round RDN' outputting the first plaintext data Pla_D1 of FIG. 7, the calculations InverseShiftRows( ), InverseSubBytes( ), and AddRoundKey( ), except for the calculation IverseMixColumns( ), are sequentially performed. The calculations InverseShiftRows( ), InverseSubBytes( ), and IverseMixColumns( ) are respectively inverse calculations of the above described SubBytes( ), ShiftRows( ), and MixColumns( ), and the calculation AddRoundKey( ) is the same as the calculation AddRoundKey( ) in the encryption operation and detailed descriptions thereof are omitted. In FIG. 7, the round key used to perform the decryption is equal to the round key used to perform the encryption of FIG. 4. For example, the round key R1 of FIG. 4 and the round key R1 of FIG. 7 have the same value (w[4, 7]). Also, the N-th round key RKN of FIG. 4 and the N-th round key RKN of FIG. 7 have the same value (w[40, 43]).

Each round in FIG. 7 may be realized by a separate logic from the corresponding round of FIG. 4. For example, the round RD1' of FIG. 7 and the round RDN of FIG. 4 corresponding to the round RD1' may be realized as separate logic from each other. On the other hand, alternatively, each round of FIG. 7 may be realized by the same logic as that of the corresponding round of FIG. 4. For example, the round RD1' of FIG. 7 and the round RDN of FIG. 4 corresponding to the round RD1' may perform the encryption and decryption at different time points by one logic.

Figure 8:
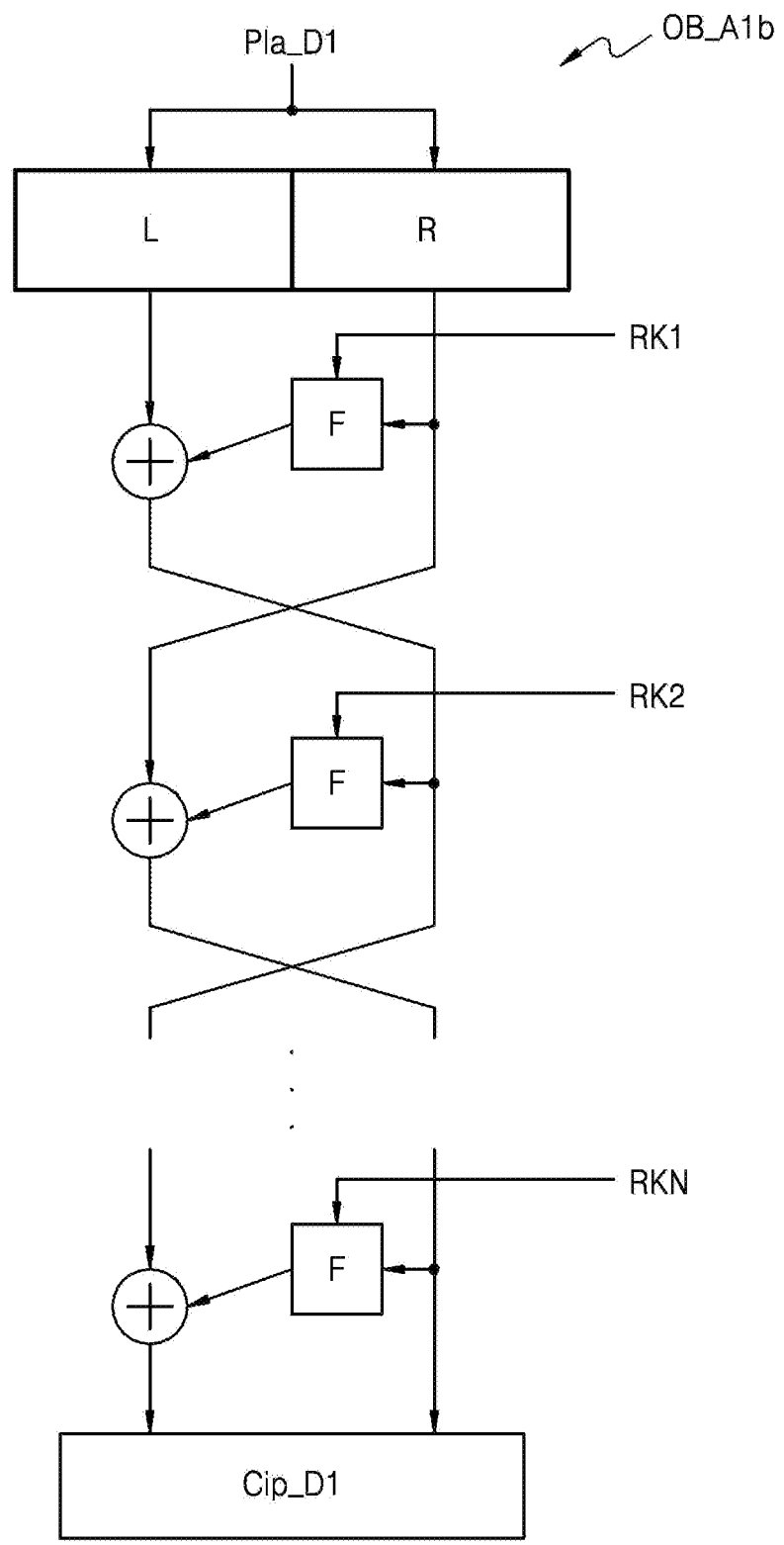
FIG. 8 is a diagram of an encryption operation performed by the operation block A of FIG. 3 according to a Feistel cipher type algorithm.

FIG. 8 is a diagram showing an example of performing encryption by the operation block A of FIG. 3 in a Feistel type algorithm. Referring to FIGS. 2 and 8, an operation block A OB_A1b of the first encryption/decryption core 220_1 performs the encryption by using an algorithm of Feistel cipher type, unlike the AES algorithm of FIG. 4 that is a non-Feistel type. In particular, the operation block A OB_A1b of the first encryption/decryption core 220_1 of the encryptor/decryptor of FIG. 2 divides the first plaintext data Pla_D1 into two parts. Then, a right part R and the round key RK1, RK2, . . . , RKN are calculated by an F function. In addition, an exclusive OR operation of the calculated result and a left part L of the first plaintext data Pla_D1 is performed, and a calculation result is output. As such, processes of dividing the input data block into two parts, encrypting the right part R, and performing an exclusive OR operation with the left part L are considered as one round. In FIG. 8, the encryption operations performed by the operation block A OB_A1*b* through N rounds are shown. The algorithm of Feistel type may include data encryption standard (DES), 1DES, and SEED. In FIG. 8, the encryption operation of the operation block A OB_A1*b* by using the Feistel type algorithm is described. However, the decryption may be performed by performing the above described encryption operations in an inverse order, and thus detailed descriptions of the decryption operation of the operation block A OB_A1*b* are omitted here.

The operation block A OB_A1 of the first encryption/decryption core 220_1 of the encryptor/decryptor of FIG. 2 may operate according to another block encryption algorithm, in addition to the above described algorithms. The above descriptions about the operation block A OB_A1 of the first encryption/decryption core 220_1 may be applied to the operation blocks A OB_A1, . . . , OB_AX of the other encryption/decryption cores 220_1, . . . , 220_X.

Figure 9:
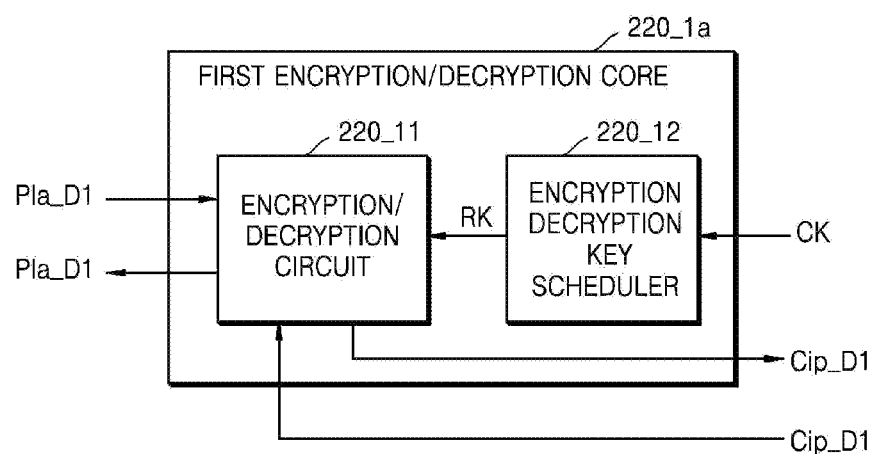
FIG. 9 is a diagram of an example of a first encryption/decryption core of the encryptor/decryptor of FIG. 2.

FIG. 9 is a diagram of an example of a first encryption/decryption core of the encryptor/decryptor of FIG. 2. Referring to FIG. 9, a first encryption/decryption core 220_1*a* may include an encryption/decryption circuit 220_11 and an encryption/decryption key scheduler 220_12. The encryption/decryption circuit 220_11 may encrypt the first plaintext data Pla_D1 as the first ciphertext data Cip_D1 by using the above described encryption algorithm, or decrypt the first ciphertext data Cip_D1 as the first plaintext data Pla_D1. The encryption/decryption circuit 220_11 may be the operation block A OB_A1*a* of FIG. 7. Therefore, detailed descriptions of the encryption/decryption circuit 220_11 are omitted. The encryption/decryption key scheduler 220_12 generates the round key RK used in each round when the encryption/decryption circuit 220_11 performs the encryption and decryption operations. The round key RK generated by the encryption/decryption key scheduler 220_12 may be the round key shown in FIG. 4. Therefore, the encryption/decryption key scheduler 220_12 may expand the input cipher key CK to generate the round key RK. The encryption/decryption key scheduler 220_12 may be the operation block B OB_B1 of FIG. 2.

Figure 10:
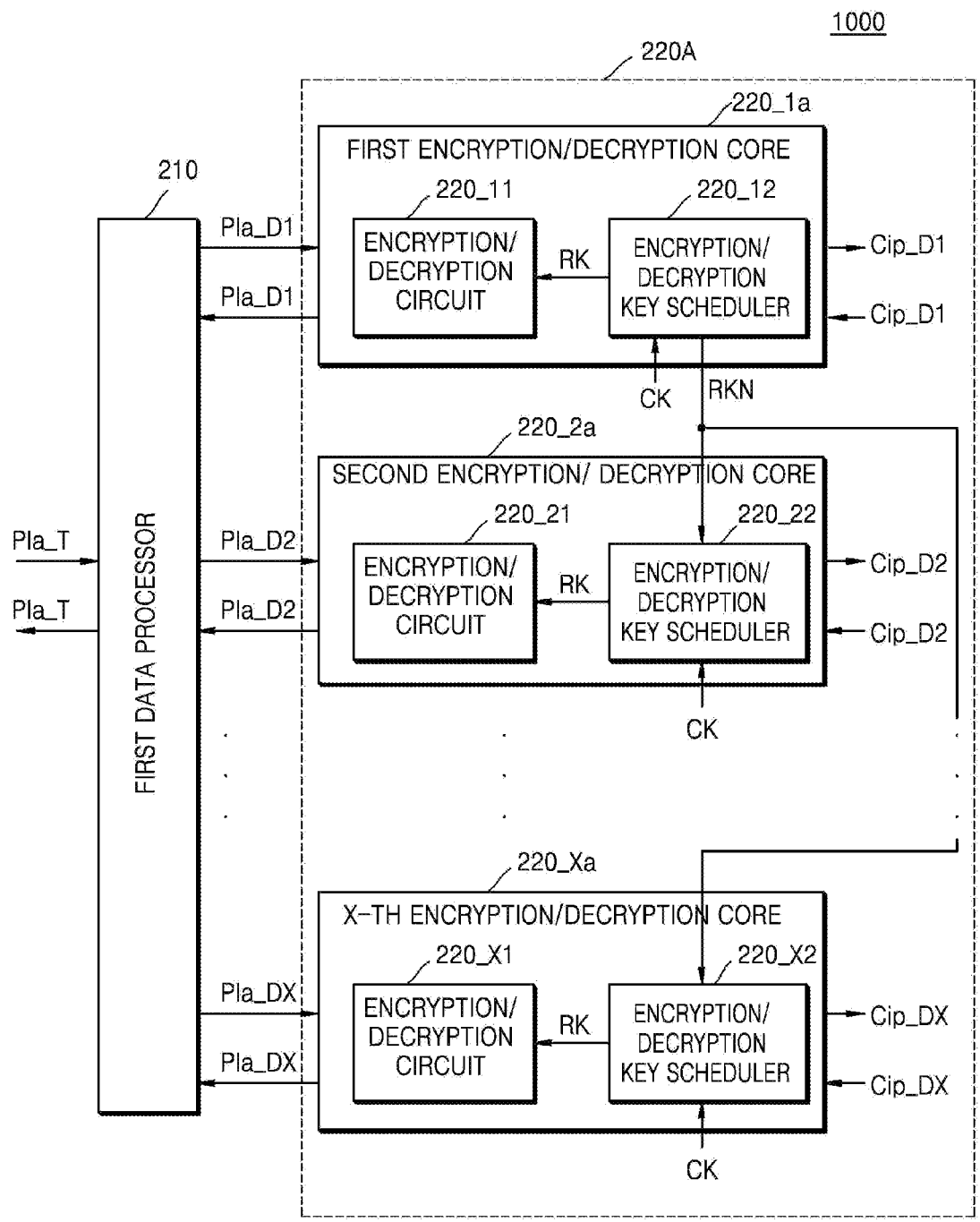
FIG. 10 is a diagram of an encryptor/decryptor according to an exemplary embodiment of the inventive concept.
Figure 11:
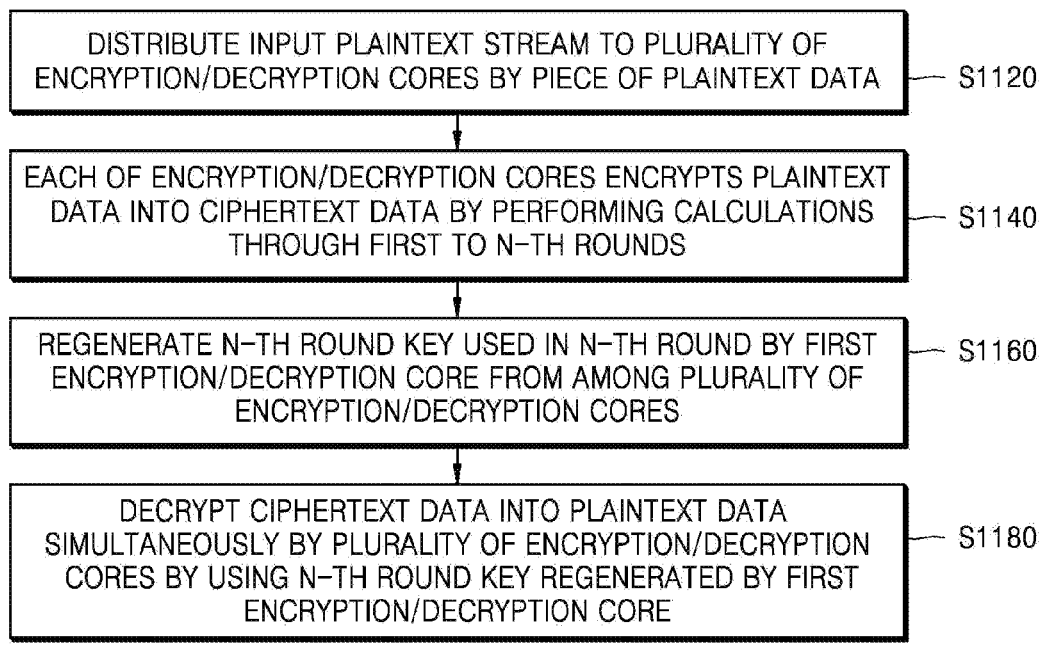
FIG. 11 is a flowchart of a method of operating the encryptor/decryptor of FIG. 10.

FIG. 10 is a block diagram of an encryptor/decryptor according to another exemplary embodiment of the inventive concept, and FIG. 11 is a flowchart of a method of operating the encryptor/decryptor of FIG. 10. Referring to FIGS. 10 and 11, an encryptor/decryptor 1000 according to the present exemplary embodiment includes a first data processor 210 and an encryption/decryption core module 220A including a plurality of encryption/decryption cores 220_1*a*, 220_2*a*, . . . , 220_Xa. The method of operating the encryptor/decryptor 1000 may include dividing the input plaintext stream Pla_T into a plurality of plaintext data Pla_D1, Pla_D2, . . . , Pla_DX and distributing the divided plaintext data to the plurality of encryption/decryption cores 220_1*a*, 220_2*a*, . . . , 220_Xa (S1120), encrypting the plaintext data into cipher text data by each of the plurality of encryption/decryption cores 220_1*a*, 220_2*a*, . . . , 220_Xa by performing calculations through first to N-th rounds sequentially (S1140), regenerating an N-th round key RKN used in the N-th round by the first encryption/decryption core 220_1*a* from among the plurality of encryption/decryption cores 220_1*a*, 220_2*a*, . . . , 220_Xa (S1160), and decrypting the ciphertext data into the plaintext data by the plurality of encryption/decryption cores 220_1*a*, 220_2*a*, . . . , 220_Xa by using the N-th round key RKN regenerated by the first encryption/decryption core 220_1*a* (S1180).

The first data processor 210 divides the plaintext stream Pla_T into a plurality pieces of plaintext data Pla_D1, Pla_D2, . . . , Pla_DX and distributes the plaintext data Pla_D1, Pla_D2, . . . , Pla_DX to the plurality of encryption/decryption cores 220_1*a*, 220_2*a*, . . . , 220_Xa (S1120). The first encryption/decryption core 220_1*a* may be the first encryption/decryption core 220_*a*1 of FIG. 9. Therefore, the first encryption/decryption core 220_1*a* may include the encryption/decryption circuit 220_11 and the encryption/decryption key scheduler 220_21. The encryption/decryption circuit 220_11 performs the encryption of the first plaintext data Pla_D1 into the first cipher text data Cip_D1 through the plurality of rounds shown in FIG. 4, and performs the decryption of the first ciphertext data Cip_D1 into the first plaintext data Pla_D1 through the plurality of rounds of FIG. 7. The second encryption/decryption core 220_2*a* to X-th encryption/decryption core 220_Xa may also include encryption/decryption circuits 220_21, . . . , 220_X1 and encryption/decryption key schedulers 220_22, . . . , 220_X2, like the first encryption/decryption core 220_1*a*. The plurality of encryption/decryption cores 220_1*a*, 220_2*a*, . . . , 220_Xa may perform the encryption of the input plaintext data (S1120).

After the plurality of encryption/decryption cores 220_1*a*, 220_2*a*, . . . , 220_Xa generate the ciphertext data, decryption of the ciphertext data may be advantageous. For example, when the ciphertext data stored in a storage device is to be used, the decryption of the ciphertext data may be performed. As described above, the N-th round key RKN is used in a first round of the decryption (second pre-round PR2 of FIG. 7). The N-th round key RKN is the round key of the final round of the encryption operation, that is, the round outputting the ciphertext data.

To do this, the first encryption/decryption core 220_1*a* from among the plurality of encryption/decryption cores 220_1*a*, 220_2*a*, . . . , 220_Xa regenerates the N-th round key RKN (S1160). In the present specification, generation of the N-th round key RKN for the decryption operation is denoted as 'regeneration' of the N-th round key RKN to be distinguished from the generation of the N-th round key RKN for the encryption operation.

The encryption/decryption key schedulers 220_22, . . . , 220_X2 of the second to X-th encryption/decryption cores 220_2*a*, . . . , 220_Xa do not separately generate the N-th round key RKN, but decrypt the ciphertext data into the plaintext data by using the N-th round key RKN regenerated by the first encryption/decryption core 220_1*a* (S1180). Therefore, all of the plurality of encryption/decryption cores do not necessarily generate the N-th round key RKN for the decryption operation, and thus, power consumption may be reduced.

In FIG. 10, the N-th round key RKN generated by the first encryption/decryption core 220_1*a* is used in other encryption/decryption cores to perform the decryption, but one or more exemplary embodiments are not limited thereto. For example, the N-th round key RKN generated by the second encryption/decryption core 220_2*a* may be used in other encryption/decryption cores to perform the decryption. This may be applied to other exemplary embodiments that will be described below.

Figure 12:
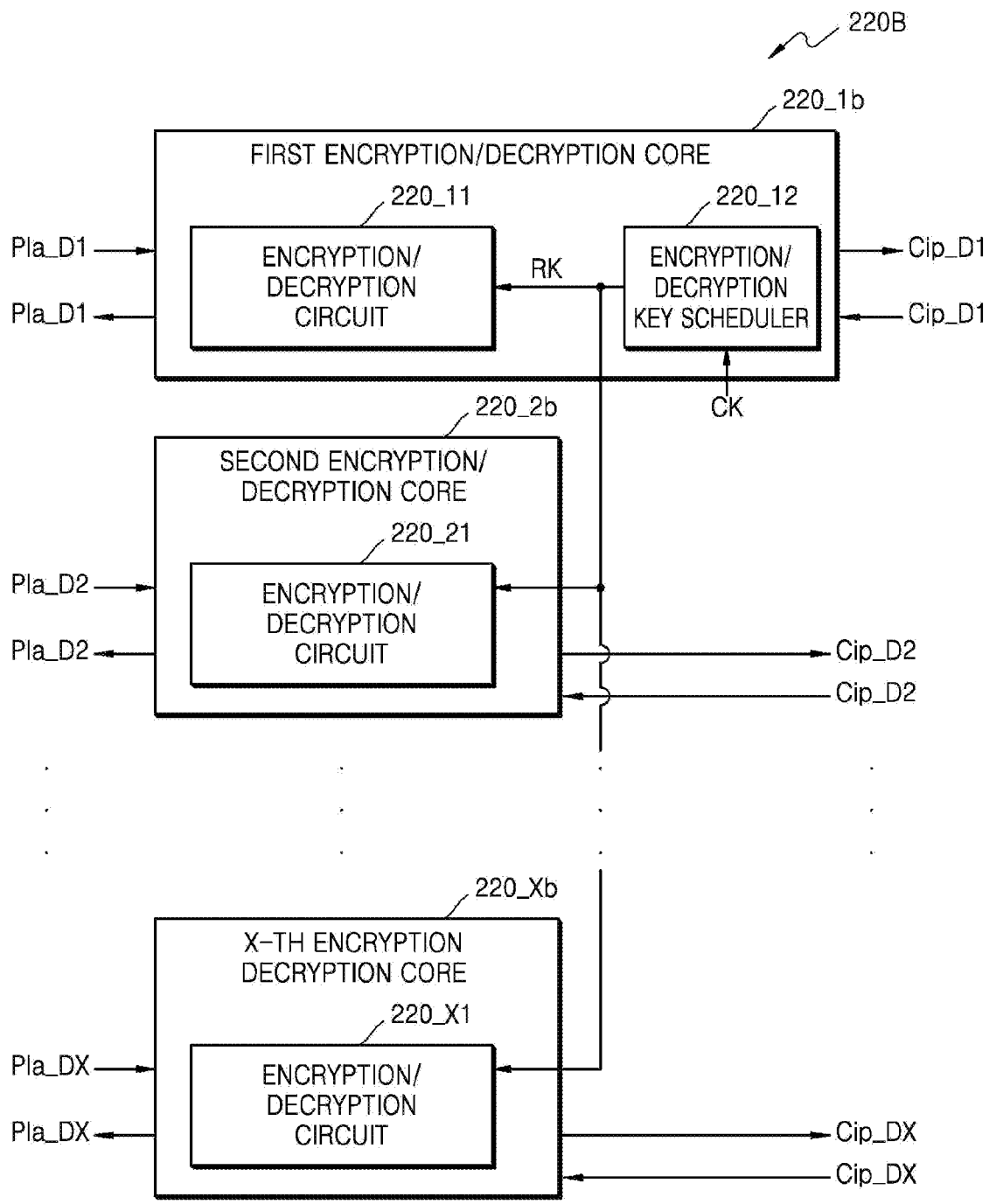
FIG. 12 is a diagram of an encryptor/decryptor according to an exemplary embodiment of the inventive concept.

FIG. 12 is a diagram of an encryptor/decryptor according to another exemplary embodiment of the inventive concept. In FIG. 12, an encryption/decryption core module 220B includes a plurality of encryption/decryption cores. The plurality pieces of plaintext data Pla_D1, Pla_D2, ..., Pla_DX divided from the plaintext stream Pla_T are provided to the plurality of encryption/decryption cores 220_1b, 220_2b, ..., 220_Xb. The first encryption/decryption core 220_1b may have the same configuration as the first encryption/decryption core 200_1a of FIG. 9. However, as will be described later, the first encryption/decryption core 220_1b may transmit all round keys RK including the N-th round key RKN to the second to X-th encryption/decryption cores 220_2b to 220_Xb.

The second to X-th encryption/decryption cores 220_2b, ..., 220_Xb of FIG. 12 may omit the encryption/decryption key schedulers, unlike the example shown in FIG. 11. The second to X-th encryption/decryption cores 220_2b, ..., 220_Xb may perform the encryption and decryption operations after receiving all the round keys RK generated by the encryption/decryption key scheduler 220_12 of the first encryption/decryption core 220_1b. Therefore, power consumption for generating the round keys used to perform the encryption and decryption and an area occupied by the encryption/decryption key scheduler may be reduced.

Figure 13:
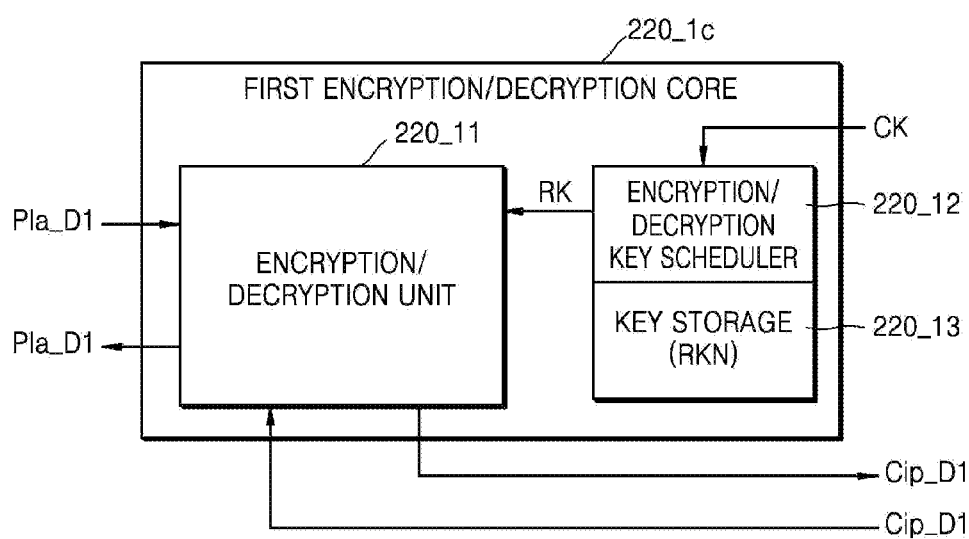
FIG. 13 is a diagram of an example of a first encryption/decryption core of the encryptor/decryptor of FIG. 2.

FIG. 13 is a diagram of another example of a first encryption/decryption core of the encryptor/decryptor of FIG. 2. The first encryption/decryption core 220_1c of FIG. 13 may include the encryption/decryption circuit 220_11 and the encryption/decryption key scheduler 220_12, like the first encryption/decryption core 220_1a of FIG. 9. The encryption/decryption circuit 220_11 and the encryption/decryption key scheduler 220_12 of FIG. 13 may perform the same operations as those of the encryption/decryption circuit 220_11 and the encryption/decryption key scheduler 220_12 of FIG. 9. Therefore, detailed descriptions about the encryption/decryption circuit 220_11 and the encryption/decryption key scheduler 220_12 are omitted. However, the encryption/decryption key scheduler 220_12 of FIG. 13 may omit generating the N-th round key RKN in the decryption operation as will be described later. The first encryption/decryption core 220_1c of FIG. 13 may further include a key storage 220_13.

The key storage 220_13 may be formed as a register. The key storage 220_13 may store the N-th round key RKN generated during encrypting the first plaintext data Pla_D1 to the first ciphertext data Cip_D1 by the first encryption/decryption core 220_1c, that is, the final round key. The key storage 220_13 may store a plurality of N-th round keys RKN corresponding to different cipher keys CK. For example, the key storage 220_13 may store the N-th round key RKN generated with respect to the cipher key CK having a first value and the N-th round key RKN generated with respect to the cipher key CK having a second value.

If the decryption of the first ciphertext data Cip_D1 is necessary, the first encryption/decryption core 220_1c may omit regenerating the N-th round key RKN, but may use the N-th round key RKN stored in the key storage 220_13 for performing the decryption. Likewise, the second to X-th encryption/decryption cores 220_2, ..., 220_X of FIG. 2 may receive the N-th round key RKN stored in the key storage 220_13 of the first encryption/decryption core 220_1c to perform the decryption operation. Therefore, operating time and power consumption required for the plurality of encryption/decryption cores 220_1, 220_2, ..., 220_X to regenerate the N-th round key RKN for performing the decryption may be reduced.

For security of the encryptor/decryptor according to the exemplary embodiment of the inventive concept, authority to access the key storage 220_13 may be strictly restricted.

The key storage 220_13 may be included in the encryption/decryption key scheduler 220_12 or formed on outside of the encryption/decryption key scheduler 220_12.

Figure 14:
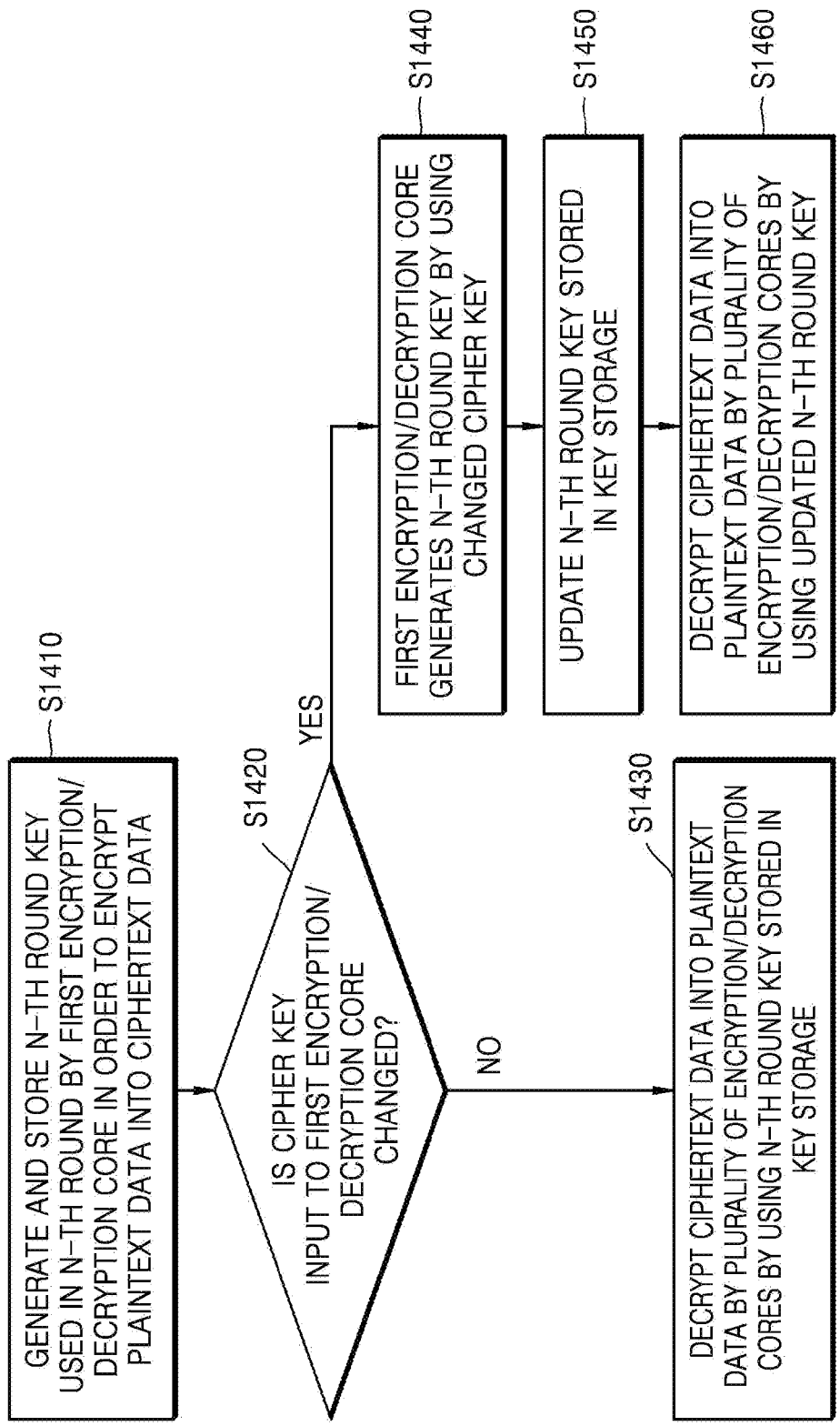
FIG. 14 is a flowchart of a method of operating the encryptor/decryptor including the first encryption/decryption core of FIG. 13.

FIG. 14 is a flowchart of a method of operating the encryptor/decryptor including the first encryption/decryption core 220_1c of FIG. 13. Referring to FIGS. 13 and 14, in operation S1410, the first encryption/decryption core 220_1c generates and stores the N-th round key RKN used in the N-th round for encrypting the first plaintext data Pla_D1 into the first ciphertext data Cip_D1. In operation S1420, it is identified whether the cipher key CK input to the first encryption/decryption core 220_1c is changed. If the cipher key CK is not changed (NO to operation S1420), the N-th round key RKN stored in the key storage 220_13 is used to perform the encryption and decryption operations in operation S1430, in which the plurality of encryption/decryption cores 220_1, 220_2, ..., 220_X of FIG. 2 decrypt the ciphertext data into the plaintext data. If the cipher key CK is changed (YES to S1420), the first encryption/decryption core 220_1c generates the N-th round key RKN by using the changed cipher key CK (S1440). In operation S1450, the N-th round key in the key storage 220_13 is updated as the N-th round key generated in operation S1440. In operation S1460, the plurality of encryption/decryption cores 220_1, 220_2, ..., 220_X of FIG. 2 decrypt the ciphertext data into the plaintext data by using the updated N-th round key RKN.

Operation S1420, in which it is identified whether the cipher key CK input into the first encryption/decryption core 220_1c is changed, may be performed if an encryption or decryption request of a new file is transmitted to the first encryption/decryption core 220_1c after the operation S1410, in which the first encryption/decryption core 220_1c generates and stores the N-th round key RKN used in the N-th round for encrypting the first plaintext data Pla_D1 into the first ciphertext data Cip_D1. The file may include at least one or more plaintext streams Pla_T. The cipher key CK may vary depending on the file. For example, the cipher key CK with respect to a first video file and the cipher key CK with respect to a second video file may have different values from each other. However, for the same file, the cipher keys CK used by the plurality of encryption/decryption cores 220_1, 220_2, ..., 220_X may be equal to each other, and thus, whether the cipher key CK has changed may be identified by the first encryption/decryption core 220_1c.

In operation S1420 of identifying whether the cipher key CK input to the first encryption/decryption core 220_1c is changed, it may be determined that the cipher key CK has changed without performing an additional comparison operation, if a new file is input. Otherwise, the cipher key CK is stored, and when a cipher key CK is newly input, the existing cipher key CK and the new cipher key CK are compared (for example, by an exclusive OR operation) to determine whether the cipher key CK is changed. Otherwise, the first encryption/decryption core 220_1c may include a key register, and when the input cipher key CK is written in the register, it may be determined that a new cipher key CK is input. In operation S1440, in which the N-th round key RKN is generated by the first encryption/decryption core 220_1c by using the changed cipher key CK, the N-th round key RKN may be generated when the plurality of encryption/decryption cores 220_1, 220_2, ..., 220_X perform the encryption, in response to the encryption request of the file or the plaintext stream Pla_T input with the changed cipher key CK.

FIG. 15 is a diagram of an encryptor/decryptor according to another exemplary embodiment of the inventive concept.

An encryptor/decryptor 1500 of FIG. 15 includes the first data processor 210 and the encryption/decryption core module 220 including the plurality of encryption/decryption cores, like the encryptor/decryptor 200 of FIG. 2. Moreover, the encryptor/decryptor 1500 of FIG. 15 may further include a second data processor 230. The second data processor 230 may output a plurality pieces of ciphertext data Cip_D1, Cip_D2, . . . , Cip_DX as a ciphertext stream Cip_T.

The second data processor 230 may operate similarly to the first data processor 210. The ciphertext stream Cip_T may be stored in a storage device (not shown) that may be electrically connected to the encryptor/decryptor 1500, or may be transmitted to outside of an electronic device including the encryptor/decryptor 1500 via a communication driver (not shown) that is electrically connected to the encryptor/decryptor 1500. Here, the ciphertext stream Cip_T may be sequentially output in a unit of a size regulated by a bus interface transmitting the data between the encryptor/decryptor 1500 and the storage device or the communication driver.

The second data processor 230 may divide the ciphertext stream Cip_T input from the outside into the plurality pieces of ciphertext data Cip_D1, Cip_D2, . . . , Cip_DX, and distribute the plurality pieces of ciphertext data Cip_D1, Cip_D2, . . . , Cip_DX to the plurality of encryption/decryption cores 220_1, 220_2, . . . , 220_X.

For example, the ciphertext stream Cip_T may be input from the storage device that may be electrically connected to the encryptor/decryptor 1500, or may be input from the outside of the electronic device including the encryptor/decryptor 1500 via the communication driver that may be electrically connected to the encryptor/decryptor 1500. The ciphertext stream Cip_T may be sequentially input in a unit of a size regulated by the bus interface transmitting the data between the encryptor/decryptor 1500 and the storage device or the communication driver. FIG. 15 shows that the first data processor 210 and the second data processor 230 are separate from each other, but in some exemplary embodiments the first data processor 210 and the second data processor 230 may be formed as one data processor.

Figure 16:
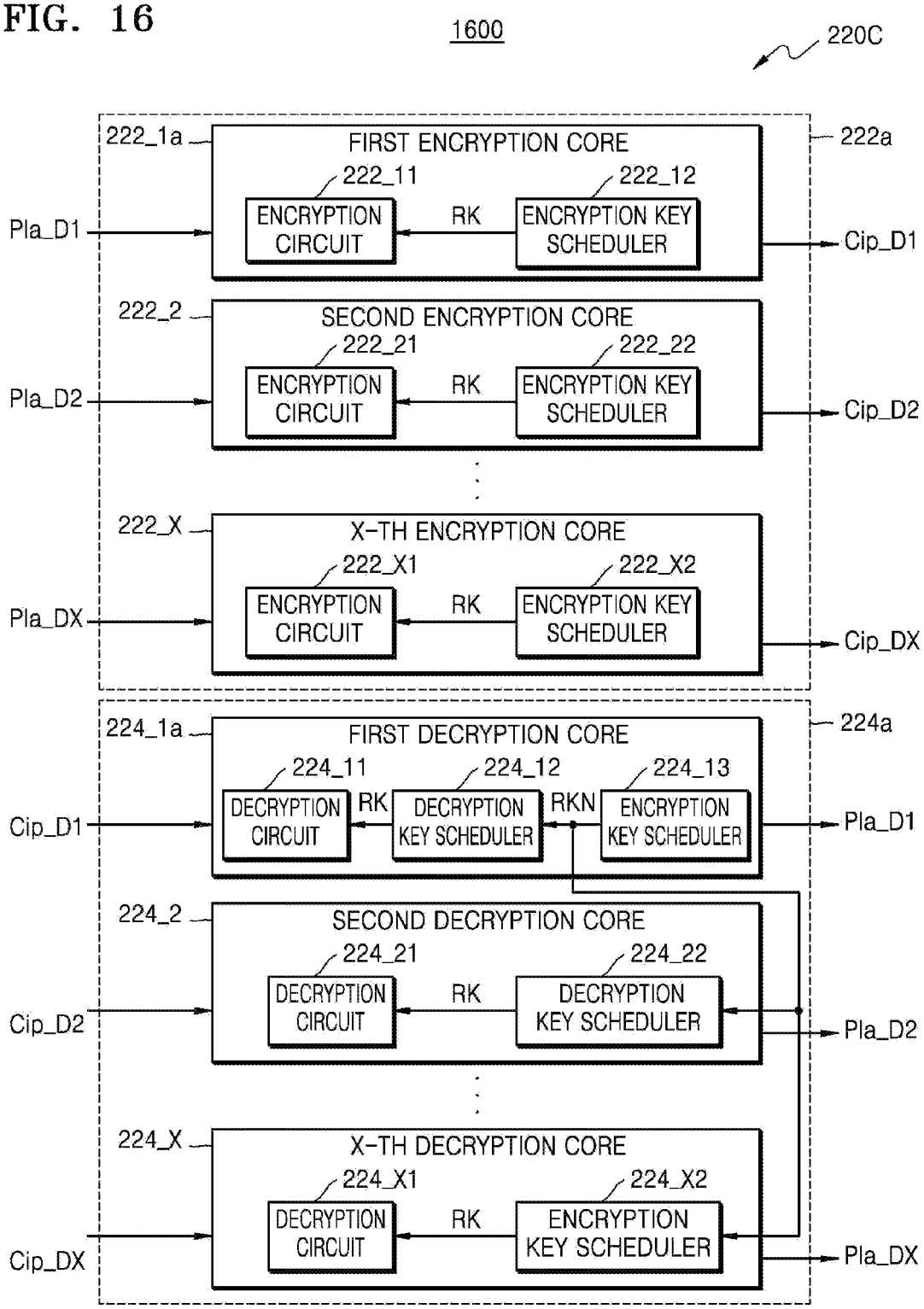

FIG. 16 is a diagram of an encryptor/decryptor according to another exemplary embodiment of the inventive concept. Referring to FIG. 16, a encryptor/decryptor 1600 has a full duplex structure, in which encryption and decryption may be performed simultaneously. To do this, an encryption/decryption core module 220C of the encryptor/decryptor 1600 may separately include an encryption core module 222a and a decryption core module 224a. The encryption core module 222a may include a plurality of encryption cores 222_1a, 222_2, . . . , 222_X and the decryption core module 224a may include a plurality of decryption cores 224_1a, 224_2, . . . , 224_X.

Each of the plurality of encryption cores 222_1a, 222_2, . . . , 222_X encrypts the input plaintext data into the ciphertext data. For example, the first encryption core 222_1a encrypts the first plaintext data Pla_D1 into the first ciphertext data Cip_D1, and the second encryption core 222_2 encrypts the second plaintext data Pla_D2 into the second ciphertext data Cip_D2. Likewise, the X-th encryption core 222_X may encrypt the X-th plaintext data Pla_DX into the X-th ciphertext data Cip_DX. As described above, the plaintext data may be divided into X or greater.

The plaintext data input to the plurality of encryption cores 222_1a, 222_2, . . . , 222_X may be divided from the plaintext stream Pla_T of FIG. 2. Thus, the encryptor/decryptor 1600 of FIG. 16 may also include the first data processor 210 of FIG. 15. However, the first data processor 210 is not shown in FIG. 16 for convenience of description. Otherwise, as described above, the first data processor 210 may be located at an outside of the encryptor/decryptor 1600, and thus, the plaintext data input into the plurality of encryption cores 222_1a, 222_2, . . . , 222_X may be input from the outside of the encryptor/decryptor 1600.

The plurality of encryption cores 222_1a, 222_2, . . . , 222_X may respectively include encryption circuits 222_11, 222_21, . . . , 222_X1 and encryption key schedulers 222_12, 222_22, . . . , 222_X2. The encryption circuits 222_11, 222_21, . . . , 222_X1 may perform the encryption operation described above with reference to FIG. 4. That is, the encryption circuits 222_11, 222_21, . . . , 222_X1 may perform the encryption sequentially through a plurality of rounds to encrypt the plaintext data into the ciphertext data. Round keys RK used by the encryption circuits 222_11, 222_21, . . . , 222_X1 in each round may be generated by the encryption key schedulers 222_12, 222_22, . . . , 222_X2. For example, the encryption key scheduler 222_12 of the first encryption core 222_1a generates the round key RK used in the encryption circuit 222_11 of the first encryption core 222_1a, and the encryption key scheduler 222_22 of the second encryption core 222_2 generates the round key RK used in the encryption circuit 222_21 of the second encryption core 222_2. Likewise, the encryption key scheduler 222_X2 of the X-th encryption core 222_X generates the round key RK used in the encryption circuit 222_X1 of the X-th encryption core 222_X.

The encryption key schedulers 222_12, 222_22, . . . , 222_X2 may generate the round keys RK in the same way of expanding the round key RK from the cipher key CK as described above. That is, the encryption key schedulers 222_12, 222_22, . . . , 222_X2 may sequentially generate the round key RK0 to the round key RKN (N-th round key RKN) of FIG. 4.

Each of the plurality of decryption cores 224_1a, 224_2, . . . , 224_X decrypts the input ciphertext data into the plaintext data. For example, the first decryption core 222_1a may decrypt the first ciphertext data Cip_D1 into the first plaintext data Pla_D1, and the second decryption core 224_2 may decrypt the second ciphertext data Cip_D2 into the second plaintext data Pla_D2 Likewise, the X-th decryption core 224_X may decrypt the X-th ciphertext data Cip_DX into the X-th plaintext data Pla_DX.

The plurality of decryption cores 224_1a, 224_2, . . . , 224_X may respectively include decryption circuits 224_11, 224_21, . . . , 224_X1 and decryption key schedulers 224_12, 224_22, . . . , 224_X2. The decryption circuits 224_11, 224_21, . . . , 224_X1 may perform the decryption operation described above with reference to FIG. 7. That is, the decryption circuits 224_11, 224_21, . . . , 224_X1 perform the decryption operations sequentially through the plurality of rounds to decrypt the ciphertext data into the plaintext data. For example, the decryption key scheduler 224_12 of the first decryption core 224_1a generates the round key RK used in the decryption circuit 224_11 of the first decryption core 224_1a, and the decryption key scheduler 224_22 of the second decryption core 224_2 generates the round key RK used in the decryption circuit 224_21 of the second decryption core 224_21. Likewise, the decryption key scheduler 224_X2 of the X-th decryption core 224_X generates the round key RK used in the decryption circuit 224_X1 of the X-th decryption core 224_X.

The decryption key schedulers 224_12, 224_22, . . . , 224_X2 may generate the round keys RK in the same way of expanding the round key RK from the cipher key CK as described above. Here, the plurality of decryption cores 224_1a, 224_2, . . . , 224_X have to use the N-th round key RKN that is used in the encryption operation in order to perform the decryption operation. The encryptor/decryptor 1600 according to the present exemplary embodiment further includes an encryption key scheduler 224_13 in the first decryption core 224_1a. The encryption key scheduler 224_13 of the first decryption core 224_1 generates the N-th round key RKN. The encryption key scheduler 224_13 of the first decryption core 224_1 may generate the N-th round key RKN in the same way as that of the above described encryption key scheduler.

The N-th round key RKN generated in the first decryption core 224_1 may be transmitted to the decryption key schedulers 224_12, 224_22, . . . , 224_X2 of the plurality of decryption cores 224_1a, 224_2, . . . , 224_X. The plurality of decryption cores 224_1a, 224_2, . . . , 224_X perform the decryption operations by using the N-th round key RKN generated in the first decryption core 224_1. As such, the encryptor/decryptor 1600 according to the present exemplary embodiment has a full duplex structure so as to perform the encryption and decryption rapidly, and the plurality of decryption cores 224_1a, 224_2, . . . , 224_X may omit an additional encryption key scheduler for generating the N-th round key RKN used in the decryption operation, and thus power consumption and a layout area may be reduced.

Figure 17:
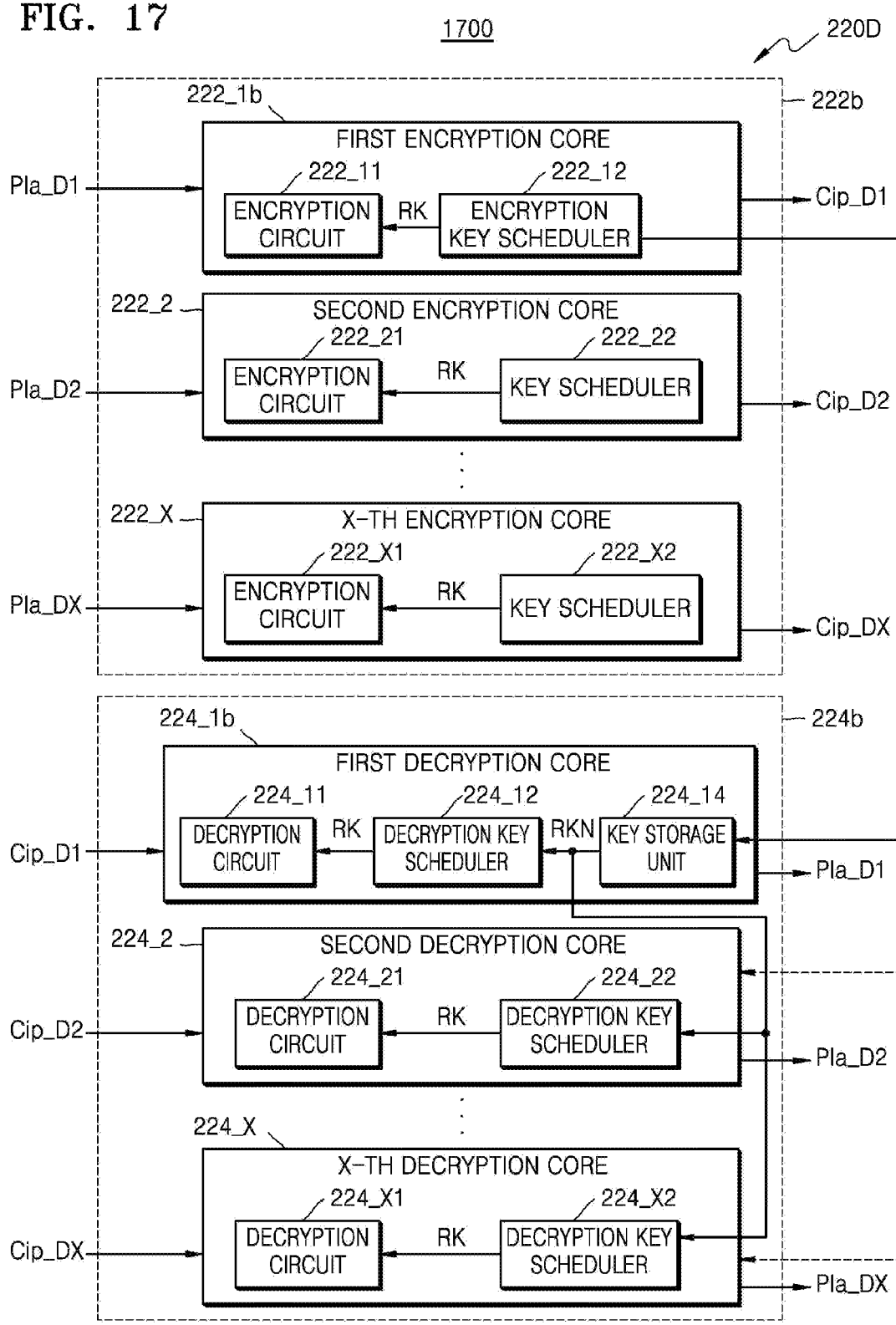

FIG. 17 is a diagram of an encryptor/decryptor according to another exemplary embodiment of the inventive concept. An encryptor/decryptor 1700 of FIG. 17 include an encryption/decryption core module 220D, and the encryption/decryption core module 220D may include an encryption core module 222b and a decryption core module 224b separately to form a full duplex structure. Descriptions about operations of the encryption core module 222b and the decryption core module 224b of FIG. 17, which are the same as those of the encryption core module 222a and the decryption core module 224a of FIG. 16, are omitted. A first encryption core 222_1b of the encryption core module 222b of FIG. 17 may transmit the N-th round key RKN to the decryption core module 222b. A first decryption core 224_1b may further include the key storage 224_14, in addition to the decryption circuit 224_11 and the decryption key scheduler 224_12. The structure and operations of the key storage 224_14 are the same as those of the key storage 220_14 described above with reference to FIG. 13, and detailed descriptions thereof are omitted.

The N-th round key RKN stored in the key storage 224_14 of the first decryption core 224_1b is transmitted to the decryption key schedulers 224_12, 224_22, . . . , 224_X2 of the plurality of decryption cores 224_1a, 224_2, . . . , 224_X. The plurality of decryption cores 224_1a, 224_2, . . . , 224_X may perform the decryption operation by using the N-th round key RKN transmitted from the first decryption core 224_1b and stored in the key storage 224_14, but are not limited thereto. The first encryption core 222_1b of FIG. 17 may transmit the N-th round key RKN to each of the plurality of decryption cores 224_1a, 224_2, . . . , 224_X when the decryption core module 224b performs the decryption operation. As described above, according to the encryptor/decryptor 1700 of the present exemplary embodiment, each of the plurality of decryption cores 224_1a, 224_2, . . . , 224_X may perform the decryption operation by using the N-th round key RKN stored in the key storage 224_14 without separately generating the N-th round key RKN used in the decryption operation, and thus, the power consumption and time taken to perform the decryption may be reduced. In order to perform the decryption operation by using the N-th round key RKN stored in the key storage 224_14, operation S1420 for identifying whether the cipher key CK is changed described above with reference to FIG. 14 may be performed first.

FIGS. 16 and 17 show examples in which the encryption core module and the decryption core module are separately provided in the encryptor/decryptor to realize a full duplex structure. However, one or more exemplary embodiments are not limited thereto.

Figure 18:
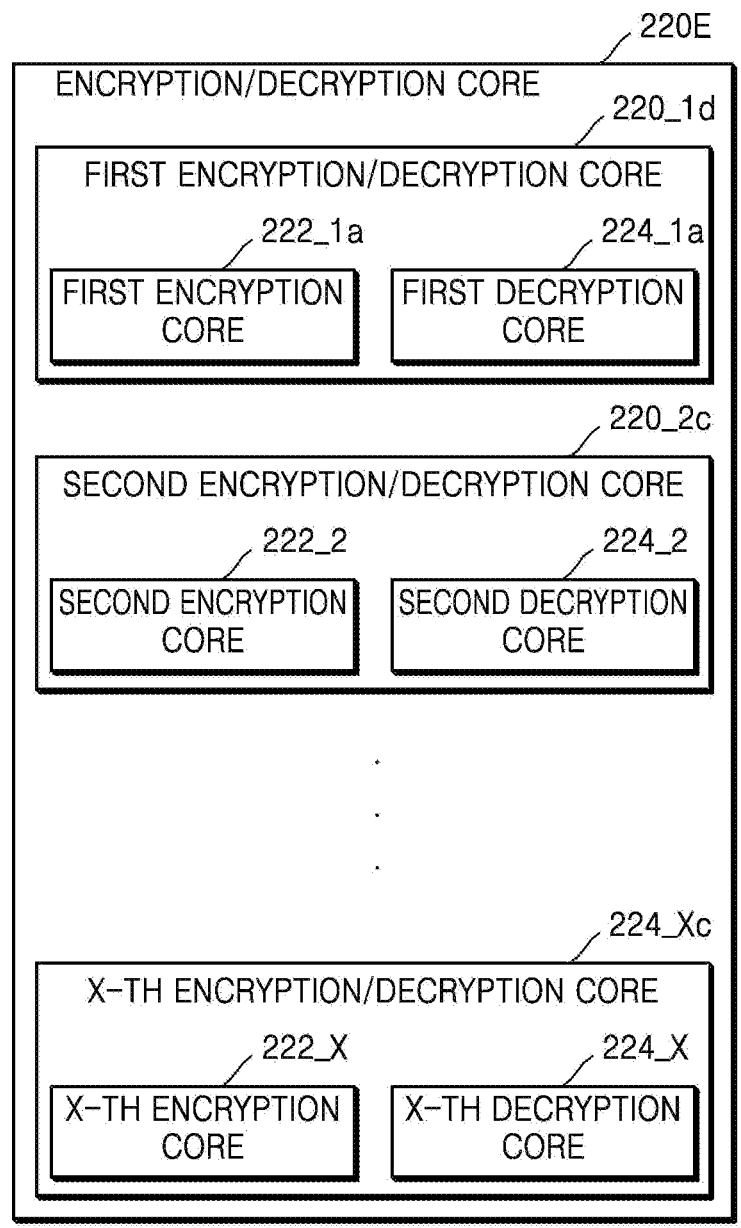

FIG. 18 shows an encryptor/decryptor according to another exemplary embodiment of the inventive concept. As shown in FIG. 18, an encryptor/decryptor 1800 includes an encryption/decryption core module 220E including a plurality of encryption/decryption cores 220_1d, 220_2c, . . . , 220_Xc, instead of including the encryption core module and the decryption core module separately. For example, the first encryption/decryption core 220_1d may include a first encryption core 222_1a and a first decryption core 224_1a, and the second decryption core 220_2c may include a second encryption core 222_2 and a second decryption core 224_2. Likewise, the X-th encryption/decryption core 220_Xc may include an X-th encryption core 222_X and an X-th decryption core 224_X. In FIG. 18, the first encryption/decryption core 220_1d includes the first encryption core 222_1a and the first decryption core 224_1a of FIG. 16, but may also include the first encryption core 224_1b and the first decryption core 224_1b of FIG. 17.

Figure 19:
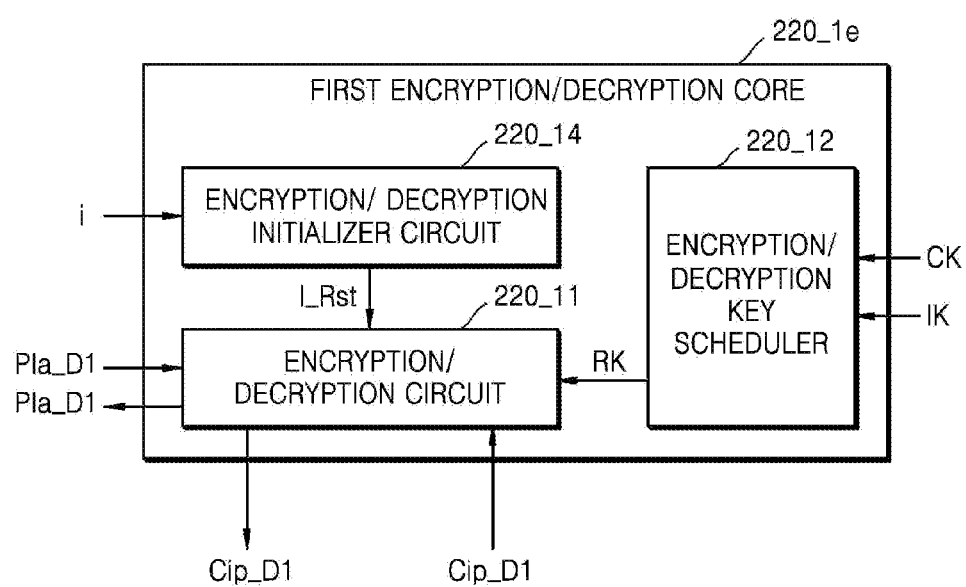
FIG. 19 is a diagram showing another example of a first encryption/decryption core of the encryptor/decryptor of FIG. 2.

FIG. 19 is a diagram showing another example of a first encryption/decryption core of the encryptor/decryptor of FIG. 2. Referring to FIG. 19, a first encryption/decryption core 200_1e includes the encryption/decryption circuit 220_11, the encryption/decryption key scheduler 220_12, and an encryption/decryption initializer circuit 220_14. The encryption/decryption circuit 220_11 and the encryption/decryption key scheduler 220_12 of FIG. 19 may operate according to the encryption algorithm of FIG. 4. However, since the first encryption/decryption core 200_1e of FIG. 19 further includes the encryption/decryption initializer circuit 220_14, the encryption/decryption circuit 220_11 may encrypt a transformed value of the first plaintext data Pla_D1 and the encryption/decryption key scheduler 220_12 may further receive an input key IK to generate an initialization round key RK used in the encryption/decryption initializer circuit 220_14.

The encryption/decryption initializer circuit 220_14 may generate an initialization result value I_Rst that is combined with the data block input to the encryption/decryption circuit 220_11 (that is, the first plaintext data Pla_D1 or the first ciphertext data Cip_D1), and may transmit the initialization result value I_Rst to the encryption/decryption circuit 220_11. The encryption/decryption initializer circuit 220_14 generates the initialization result value I_Rst by performing encryption or decryption of a tweak i that is distinguished from the data block, by using the initialization round key RK generated with respect to the input key IK that is different from the cipher key CK. For example, the initialization result value I_Rst may correspond to a result of executing the AES algorithm by using the tweak i and an XTS-AES key, when the AES algorithm is executed in the XTS mode.

Figure 20A:
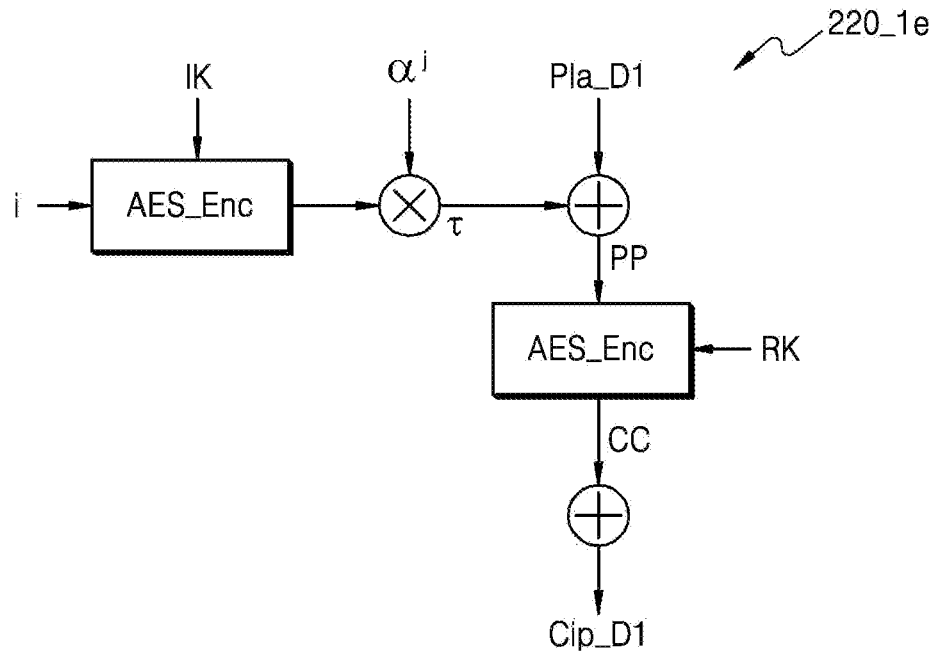
FIGS. 20A and 20B are diagrams of examples of the first encryption/decryption core of FIG. 19.
Figure 20B:
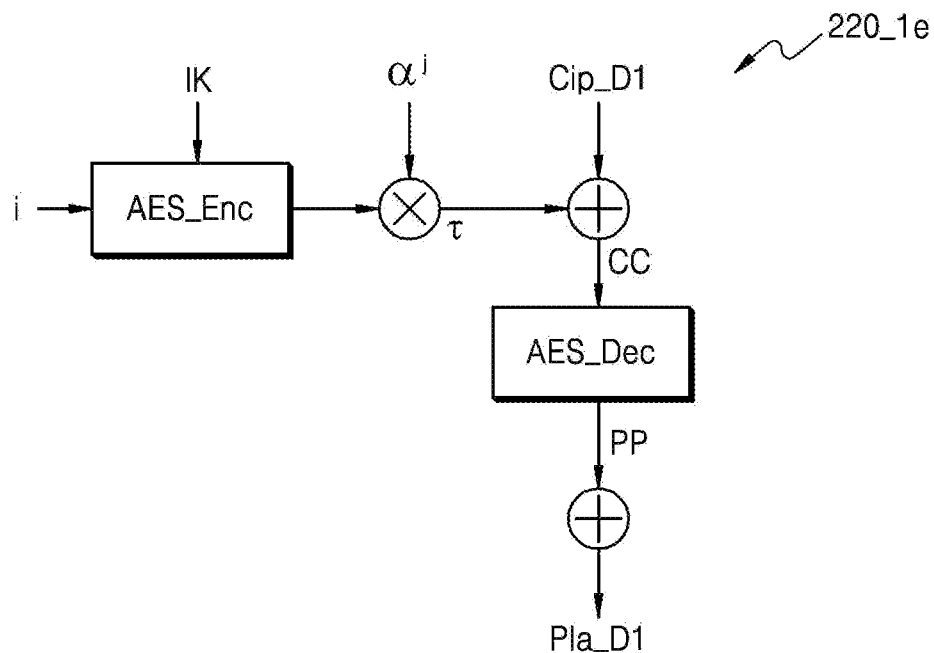

FIGS. 20A and 20B are diagrams illustrating examples of operations of the first encryption/decryption core 200_1e of FIG. 19. FIG. 20A shows an example of an operation of the first encryption/decryption core 200_1e for performing encryption, and FIG. 20B shows an example of an operation of the first encryption/decryption core 200_1e for performing decryption. Referring to FIGS. 19 and 20A, a module AES_Enc of the first encryption/decryption core 200_1e encrypts the tweak i by using the AES algorithm. The module AES_Enc performs the AES encryption. Therefore, the tweak i may be encrypted through a plurality of rounds as shown in FIG. 4. The initialization round key RK in each round for encrypting the tweak i may be expanded from the input key IK. The tweak i may have the same size as the data block.

The encrypted value of the tweak is modular multiplied by a first primitive value $\alpha^0$. A first result value $\tau$ of the modular multiplication of the encrypted value of the tweak and the first primitive value $\alpha^0$ is generated as the initialization result value I_Rst. The first primitive value is 1 that is modular multiplied by the encrypted value of the tweak, and thus, the initialization result value is equal to the encrypted value of the tweak i. $\alpha$ denotes a primitive element of a binary field, and a primitive value $\alpha^j$ is a value obtained through involution of $\alpha$ for j times, that is, a value obtained by subtracting 1 from a serial number of the plaintext data. For example, if the plaintext stream Pla_T is divided into the first to X-th plaintext data Pla_D1 to Pla_DX sequentially and successively in FIG. 2, the serial numbers of the first to X-th plaintext data may be set as 1 to X, and j in the primitive value & denotes 0 to X−1.

The first result value $\tau$ is calculated with the first plaintext data Pla_D1 (exclusive OR operation). A second result value PP obtained through the exclusive OR operation of the first result value $\tau$ and the first plaintext data Pla_D1 is input to the module AES_Enc. The module AES_Enc encrypts the second result value PP through a plurality of rounds by using the AES algorithm to output a third result value CC. The round key RK used in each round for encrypting the second result value PP is expanded from the cipher key CK. The first ciphertext data Cip_D1 is generated from the exclusive OR operation of the third result value CC and the first result value $\tau$.

In FIG. 20A, the module AES_Enc for encrypting the tweak i and the module AES_Enc for encrypting the result value PP of the first plaintext data are separately provided, but one module AES_Enc may perform the encryption of the tweak i and the encryption of the result value PP at different time points. That is, one module AES_Enc may encrypt the tweak i, and after that, may encrypt the result value PP.

Referring to FIGS. 19 and 20B, the module AES_Enc of the first encryption/decryption core 200_1e encrypts the tweak i by using the AES algorithm. The encryption of the tweak i may be performed in the same manner as that of FIG. 20A. The first result value $\tau$, that is, the initialization result value I_Rst is calculated with the first ciphertext data Cip_D1 (exclusive OR operation) to generate the third result value CC of FIG. 20A. Since the first result value $\tau$ is the encryption result from the same tweak i and the same input key IK, the first result value $\tau$ is equal to the first result value $\tau$ of FIG. 20A. The third result value CC is decrypted by the module AES_Dec by using the AES algorithm to generate the second result value PP of FIG. 20A. The module AES_Dec is a module performing the AES decryption. The second result value PP is calculated with the first result value $\tau$ (exclusive OR operation), and then, the first plaintext data Pla_D1 may be output.

Figure 21:
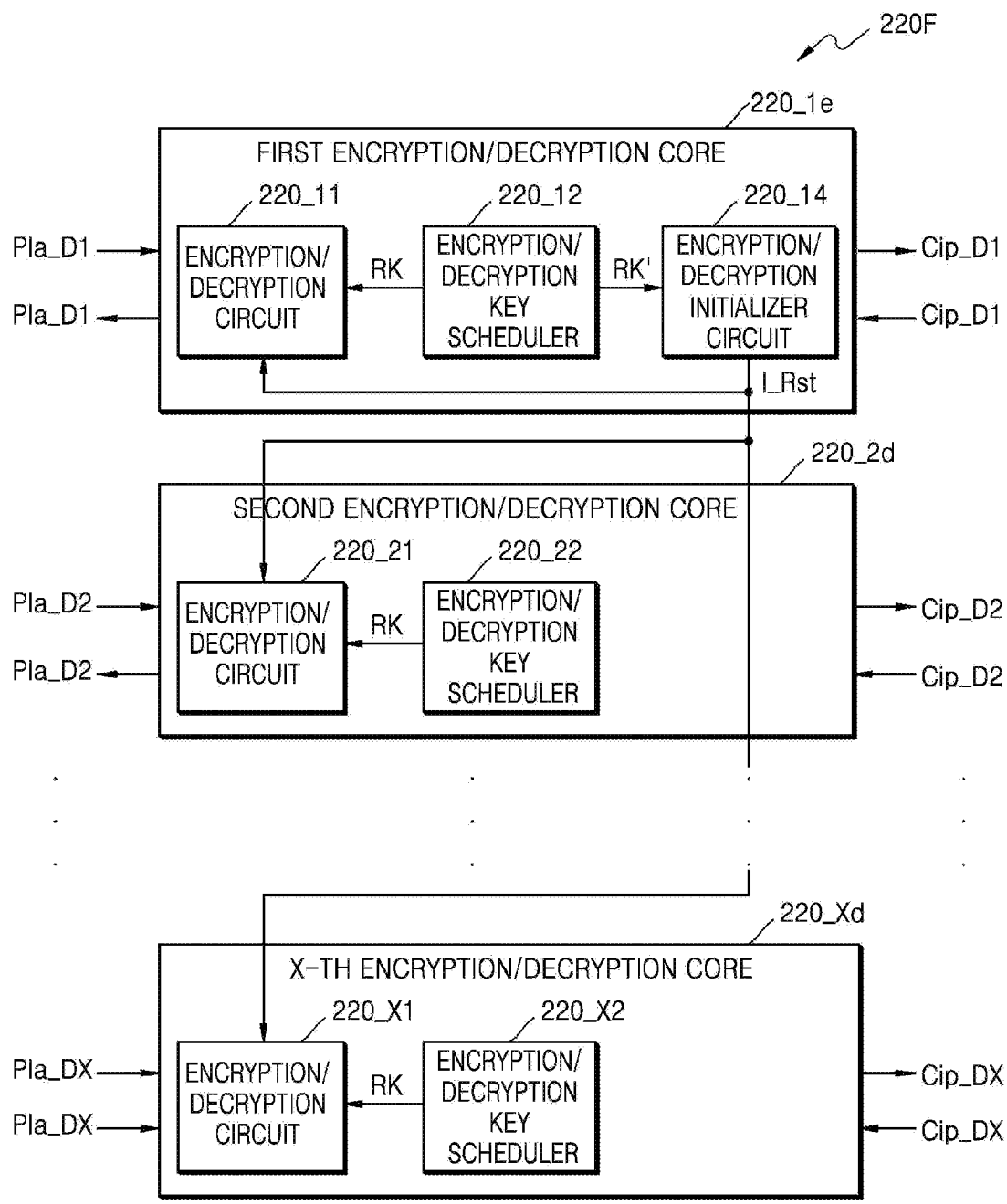
FIG. 21 is a diagram of an encryptor/decryptor according to an exemplary embodiment of the inventive concept.
Figure 22:
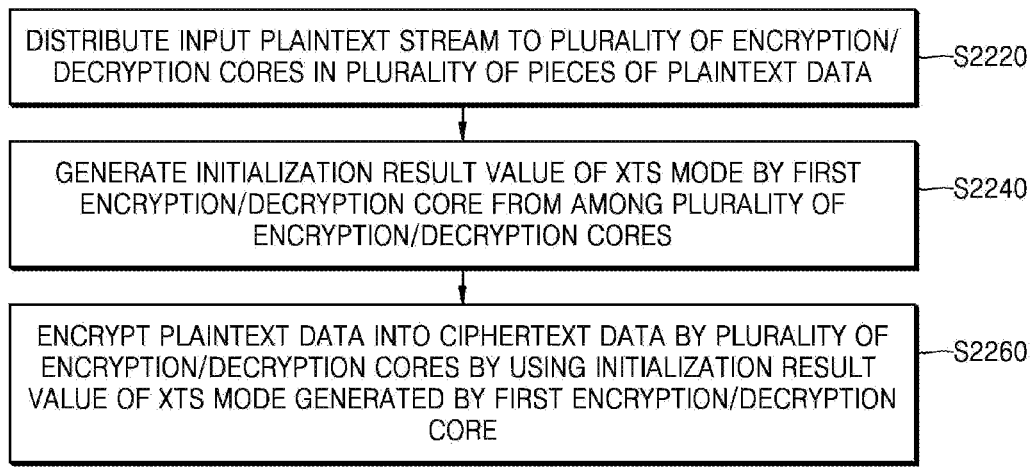
FIGS. 22 and 23 are flowcharts of a method of operating the encryptor/decryptor of FIG. 21.
Figure 23:
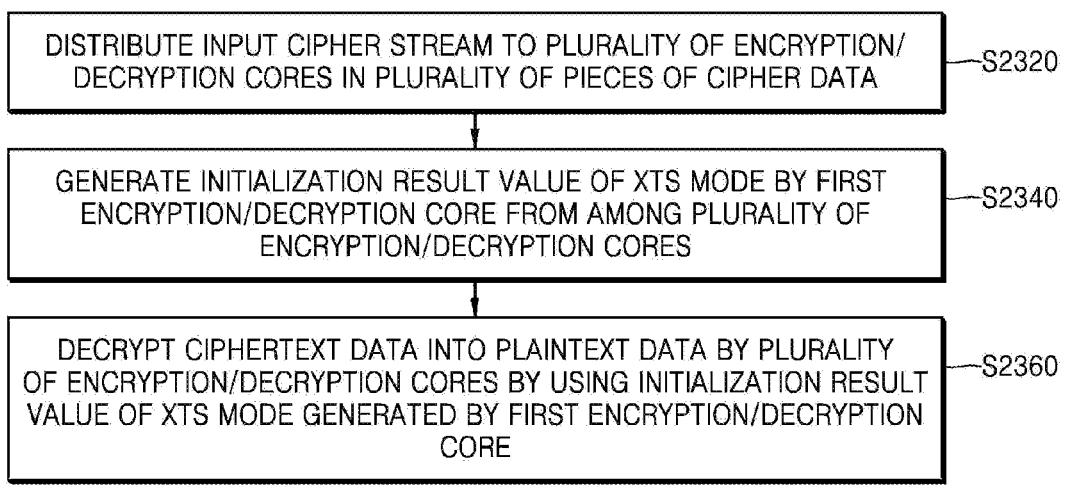

FIG. 21 is a diagram of an encryptor/decryptor according to another exemplary embodiment of the inventive concept, and FIGS. 22 and 23 are flowcharts of a method of operating the encryptor/decryptor of FIG. 21. Referring to FIGS. 21 and 22, a plurality pieces of plaintext data Pla_D1, Pla_D2, ..., Pla_DX divided from the plaintext stream Pla_T are distributed to the plurality of encryption/decryption cores 220_1e, 220_2d, ..., 220_Xd that are included in an encryption/decryption core module 220F of the encryptor/decryptor 2100 (S2220). Division and distribution of the plaintext stream Pla_T may be performed by the first data processor 210 as described above with reference to FIG. 2, but the first data processor 210 is omitted in FIG. 21 for convenience of description.

The first encryption/decryption core 220_1e from among the plurality of encryption/decryption cores 220_1e, 220_2d, ..., 220_Xd generates the initialization result value I_Rst in an XTS mode (S2240). The first encryption/decryption core 220_1e may include the encryption/decryption circuit 220_11, the encryption/decryption key scheduler 220_12, and the encryption/decryption initializer circuit 220_14. The first encryption/decryption core 220_1e may correspond to the first encryption/decryption core 220_1e of FIG. 19. Therefore, detailed descriptions about operation of the first encryption/decryption core 220_1e are omitted here.

The second to X-th encryption/decryption cores 220_2d, ..., 220_Xd may include encryption/decryption circuits 220_21, ..., 220_X1 and encryption/decryption key schedulers 220_22, ..., 220_X2. The encryption/decryption circuits 220_21, ..., 220_X1 of the second to X-th encryption/decryption cores 220_2d, ..., 220_Xd may perform the operations that are the same as that of the encryption/decryption circuit 220_11 of the first encryption/decryption core 220_1e. That is, the plaintext data that is transformed by the initialization result value I_Rst is encrypted. The encryption/decryption key schedulers 220_22, ..., 220_X2 of the second to X-th encryption/decryption cores 220_2d, ..., 220_Xd generate the round keys RK used in the encryption/decryption circuits 220_21, ..., 220_X1 like the encryption/decryption key scheduler 220_12 of the first encryption/decryption core 220_1e. However, the second to X-th encryption/decryption cores 220_2d, ..., 220_Xd do not include elements for initializing the encryption/decryption, but receive the initialization result value I_Rst generated by the encryption/decryption initializer circuit 220_14 of the first encryption/decryption core 220_1e. Therefore, the encryption/decryption key schedulers 220_22, ..., 220_X2 of the second to X-th encryption/decryption cores 220_2d, ..., 220_Xd may not generate the initialization round key RK for encrypting the tweak as shown in FIG. 19.

That is, the first encryption/decryption core 220_1e generates the initialization result value (S2240). The initialization result value I_Rst may be the initialization result value of the XTS mode described with reference to FIGS. 19-20B. The plurality of encryption/decryption cores 220_1e, 220_2d, ..., 220_Xd encrypt the plaintext data into the ciphertext data by using the initialization result value I_Rst of the XTS mode, which is generated by the first encryption/decryption core 220_1e (S2260). For example, the first encryption/decryption core 220_1e encrypts the first plaintext data Pla_D1 into the first ciphertext data Cip_D1, and the second encryption/decryption core 220_2d encrypts the second plaintext data Pla_D2) into the second ciphertext data Cip_D2. In addition, the X-th encryption/decryption core 220_Xd encrypts the X-th plaintext data Pla_DX into the X-th ciphertext data Cip_DX.

The decryption in the encryptor/decryptor 2100 of FIG. 21 is performed as follows. As shown in FIG. 23, a plurality pieces of ciphertext data Cip_D1, Cip_D2, ..., Cip_DX divided from the ciphertext stream Cip_T are distributed to the plurality of encryption/decryption cores 220_1e, 220_2d, ..., 220_Xd (S2320), and the first encryption/decryption core 220_1e generates the initialization result value (S2340). The plurality of encryption/decryption cores 220_1e, 220_2d, . . . , 220_Xd decrypt the ciphertext data into the plaintext data by using the initialization result value I_Rst of the XTS mode generated by the first encryption/decryption core 220_1e (S2360).

As described above, according to the encryptor/decryptor 2100 of the present exemplary embodiment, the plurality of encryption/decryption cores may perform the encryption or decryption by using the initialization result value of the XTS mode generated by one encryption/decryption core, and thus, the power consumption in the encryption or decryption operation may be reduced. The modular multiplication described above may be performed by an additional module, rather than by the encryption/decryption core, and then, may be transmitted to the encryption/decryption cores.

Figure 24:
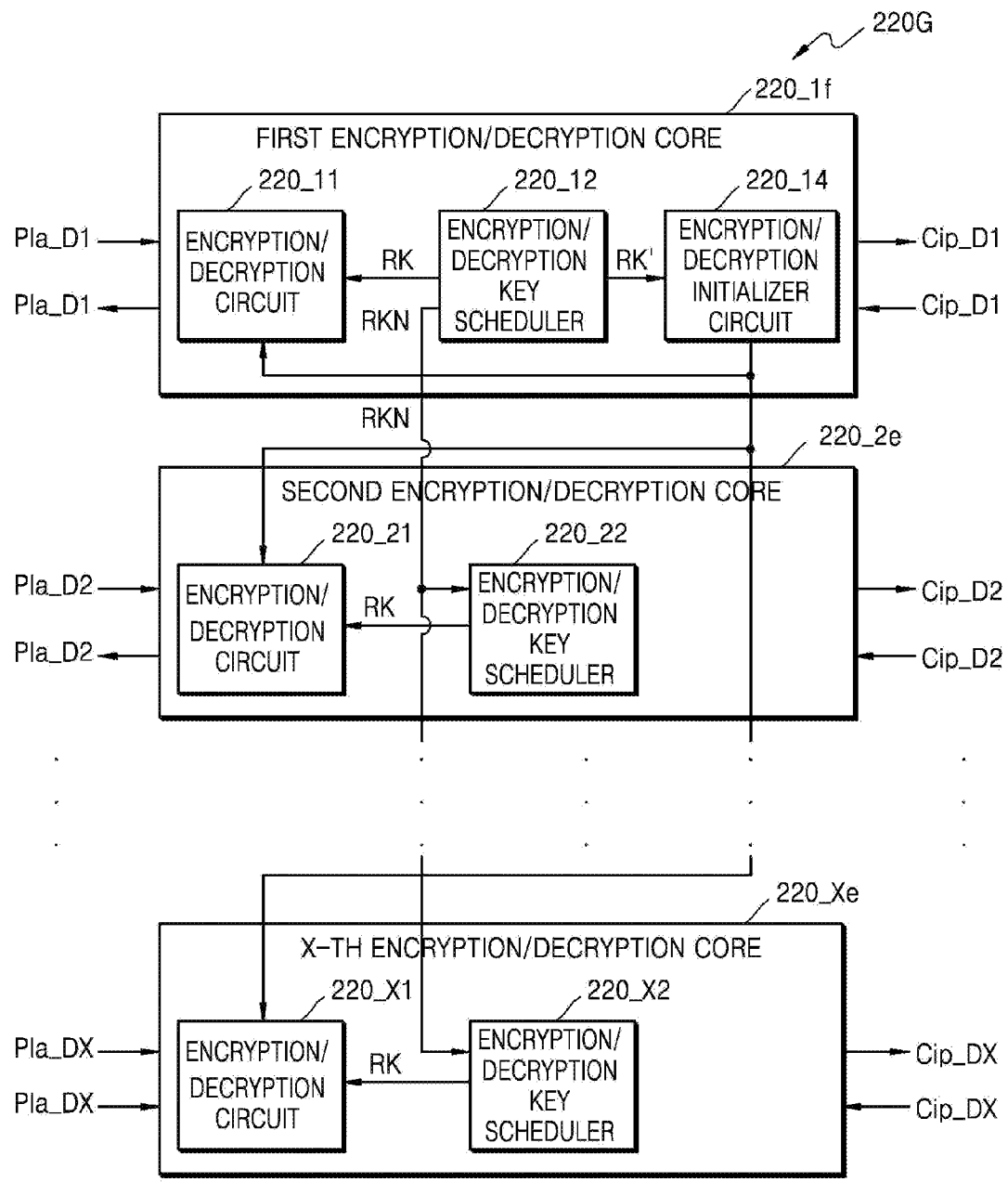
FIGS. 24 to 26 are diagrams of encryptors/decryptors according to one or more exemplary embodiments of the inventive concept.
Figure 25:
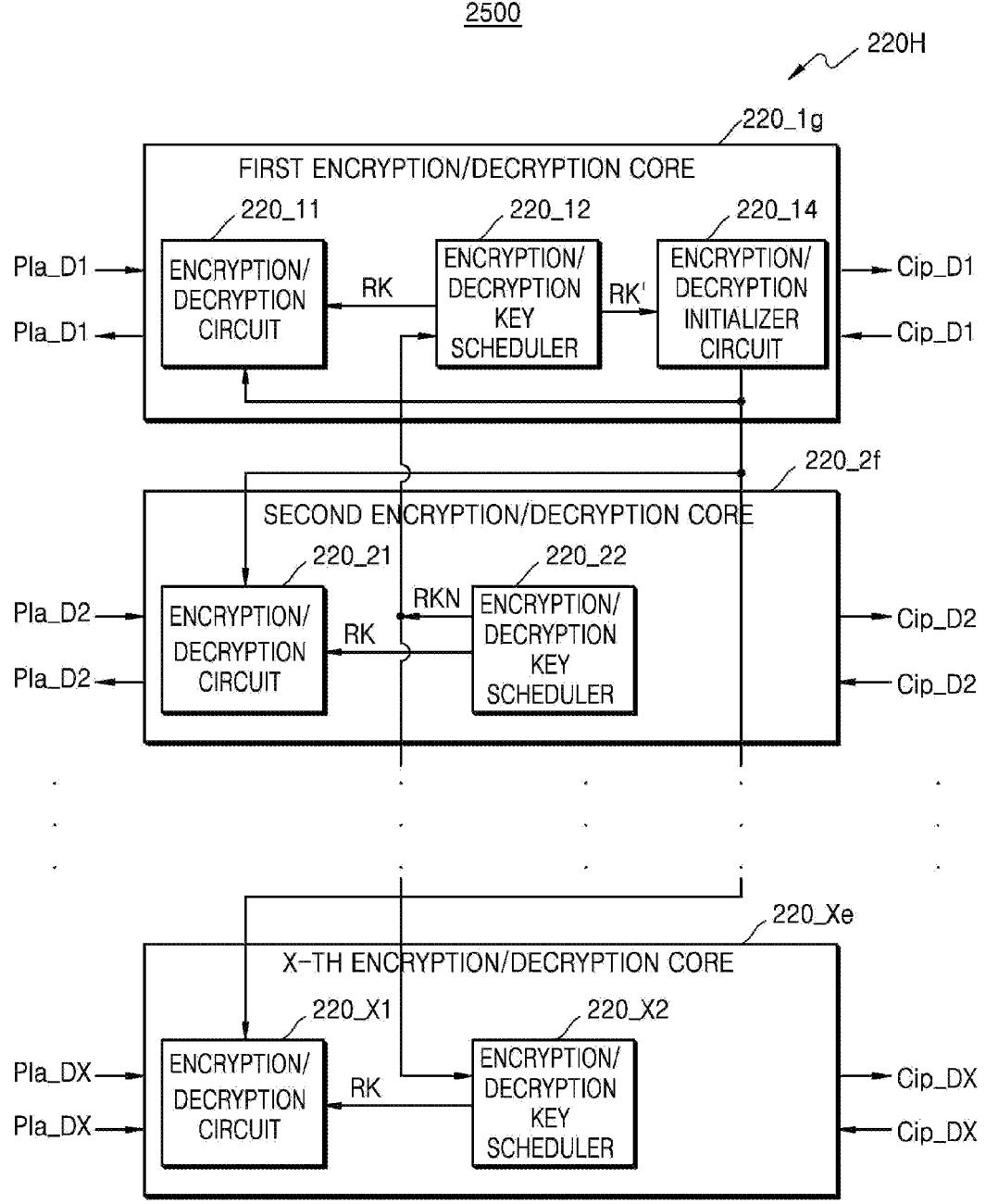
Figure 26:
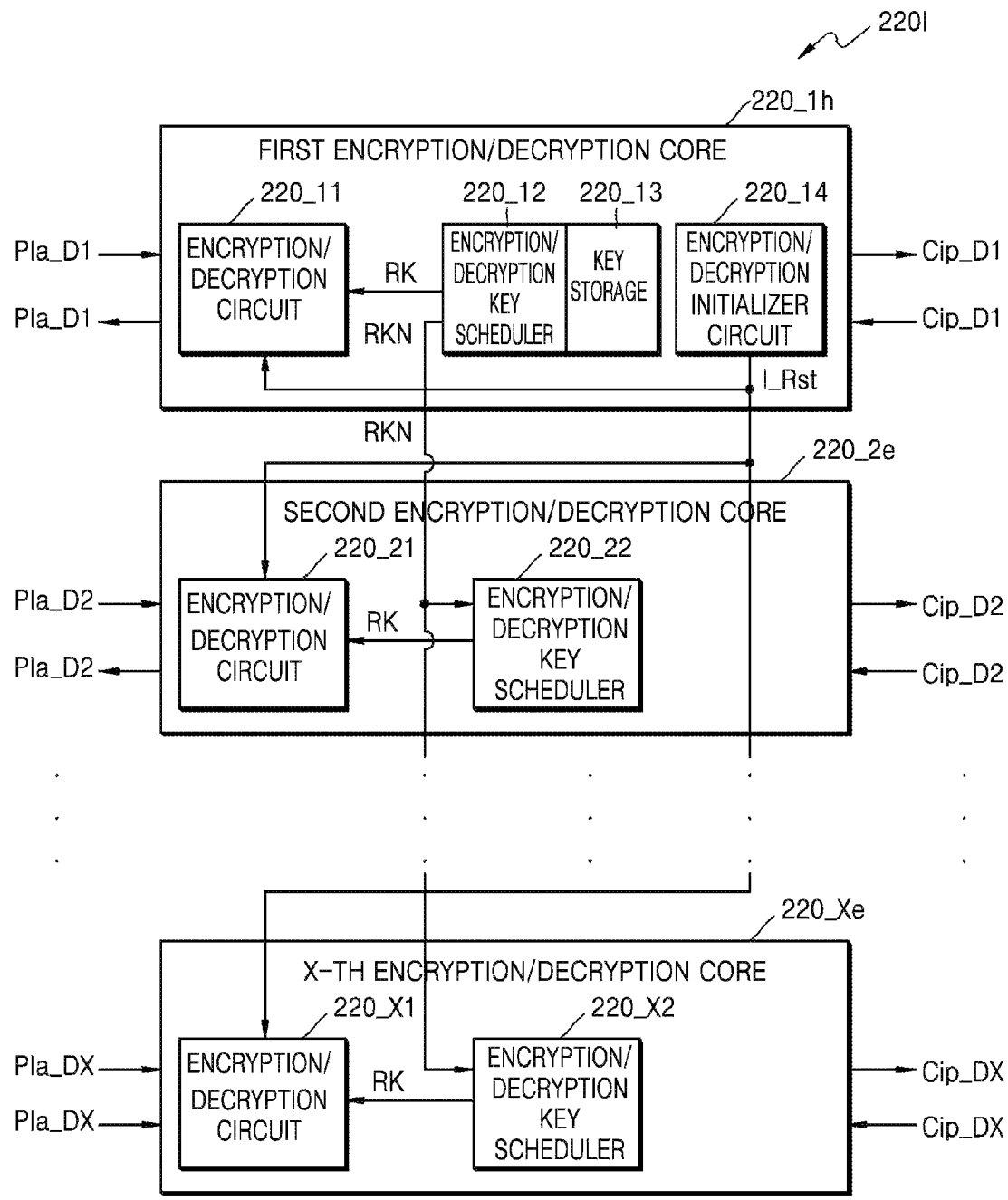

FIGS. 24 to 26 are diagrams of encryptor/decryptors according to one or more exemplary embodiments of the inventive concept. Referring to FIG. 24, the encryptor/decryptor 2400 may include the plurality of encryption/decryption cores 220_1f, 220_2e, . . . , 220_Xe in an encryption/decryption core module 220G, like the encryptor/decryptor 2100 of FIG. 21. Therefore, the plurality of encryption/decryption cores 220_1f, 220_2e, . . . , 220_Xe may perform the encryption or decryption by using the initialization result value I_Rst generated by the first encryption/decryption core 220_1f. Moreover, in the encryptor/decryptor 2400 of FIG. 24, the plurality of encryption/decryption cores 220_1f, 220_2e, . . . , 220_Xe may perform the decryption operation by using the N-th round key RKN regenerated by the encryption/decryption key scheduler 220_12 of the first encryption/decryption core 220_1f, like in the encryptor/decryptor 1000 of FIG. 10.

In the encryptor/decryptor 2400 of FIG. 24, the initialization result value I_Rst and the N-th round key RKN used in the plurality of encryption/decryption cores 220_1f, 220_2e, . . . , 220_Xe are generated or regenerated by the first encryption/decryption core 220_1f, but are not limited thereto. For example, as shown in the encryptor/decryptor 2500 of FIG. 25, the initialization result value I_Rst and the N-th round key RKN used in a plurality of encryption/decryption cores 220_1g, 220_2f, . . . , 220_Xe of an encryption/decryption circuit 220H may be generated and regenerated by different encryption/decryption cores. In FIG. 25, the initialization result value I_Rst is generated by the first encryption/decryption core 220_1g, and the N-th round key RKN is regenerated by the second encryption/decryption core 220_2f. Therefore, power consumption in the encryption or decryption operation in the encryptor/decryptor 2400 of FIG. 24 and the encryptor/decryptor 2500 of FIG. 25 may be reduced. Moreover, according to the encryptor/decryptor 26000 of FIG. 26, the first encryption/decryption core 220_1h may further include the key storage 220_13 as shown in FIG. 13, the plurality of encryption/decryption cores 220_1h, 220_2e, . . . , 220_Xe of an encryption/decryption circuit 220I perform the decryption by using the N-th round key RKN that is generated during the encryption and stored in the key storage 220_13, and thus, power consumption and operating time taken to regenerate the N-th round key RKN may be reduced.

Figure 27A:
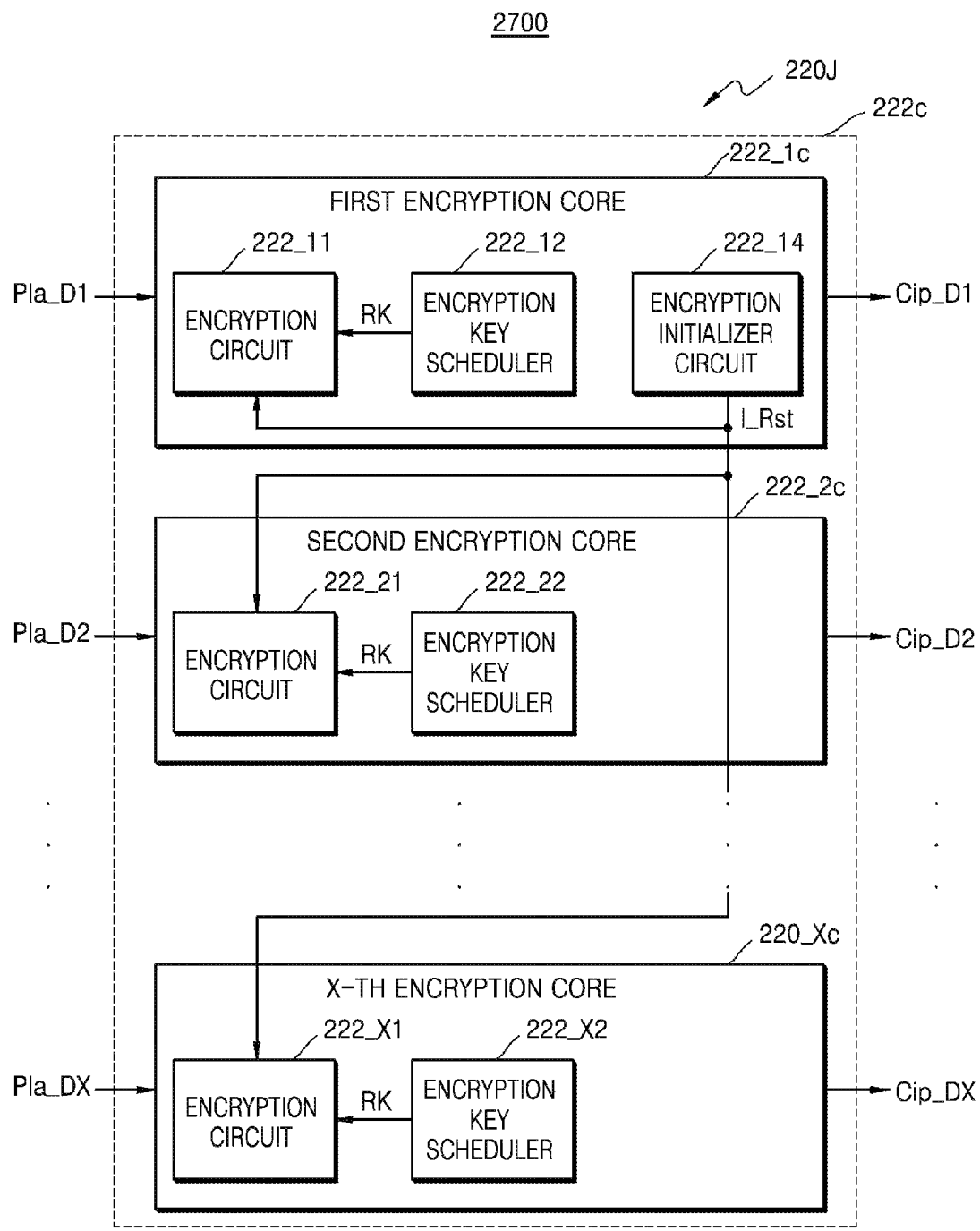
FIGS. 27A and 27B are diagrams of an encryption core module and a decryption core module of an encryptor/decryptor according to an exemplary embodiment of the inventive concept.
Figure 27B:
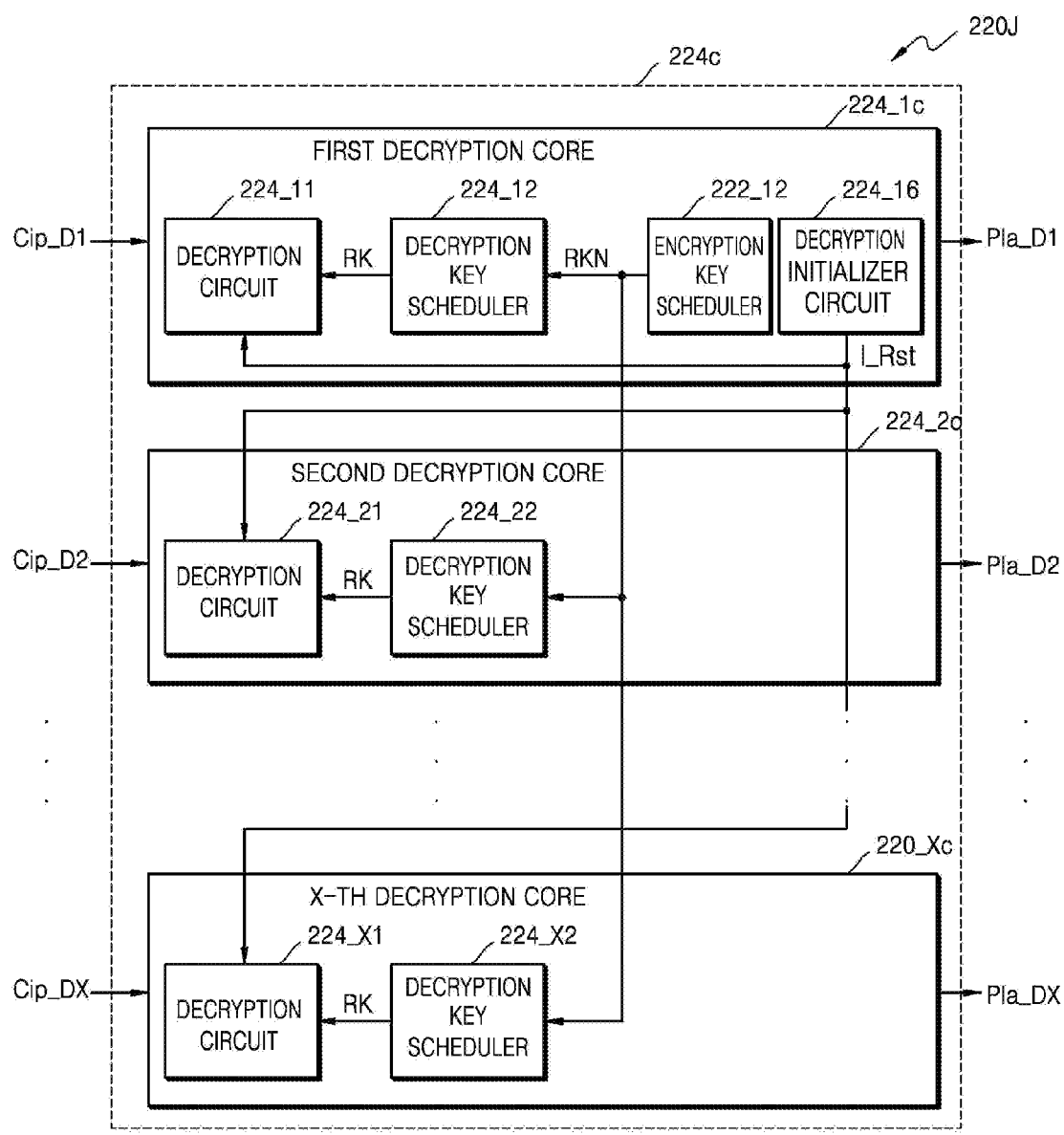

FIGS. 27A and 27B are diagrams of an encryption core module and a decryption core module of an encryptor/decryptor according to another exemplary embodiment of the inventive concept. An encryptor/decryptor 2700 is formed to have a full duplex structure, in which the encryption and the decryption may be performed simultaneously. An encryption/decryption core 220J includes an encryption core module 222c and a decryption core module 224c, and the encryption core module 222c includes a plurality of encryption cores 222_1c, 222_2c, . . . , 222_Xc and the decryption core module 224c includes a plurality of decryption cores 224_1c, 224_2c, . . . , 224_Xc. The first encryption core 222_1c may include an encryption circuit 222_11, an encryption key scheduler 222_12, and an encryption initializer circuit 222_14. In addition, the first decryption core 224_1c may include a decryption circuit 224_11, a decryption key scheduler 224_12, and a decryption initializer circuit 224_16. The encryption circuit 222_11, the encryption key scheduler 222_12, and the encryption initializer circuit 222_14 of the first encryption core 222_1c may perform operations that are the same as the operations performed by the encryption/decryption circuit 220_11, the encryption/decryption key scheduler 220_12, and the encryption/decryption initializer circuit 220_14, respectively, of the first encryption/decryption core 220_1e of FIG. 21 during the encryption operation. In addition, a decryption circuit 224_11, a decryption key scheduler 224_12, and a decryption initializer circuit 224_14 of the first decryption core 224_1c may perform operations that are the same as the operations performed by the encryption/decryption circuit 220_11, the encryption/decryption key scheduler 220_12, and the encryption/decryption initializer circuit 220_14, respectively, of the first encryption/decryption core 220_1e of FIG. 21 during the decryption operation. The decryption initialization circuit 224_14 may include the module AES_Enc of FIG. 20B.

The second to X-th encryption cores 222_2c, . . . , 222_Xc may include encryption circuits 222_21, . . . , 222_X1 and encryption key schedulers 222_22, . . . , 222_X2. In addition, the second to X-th decryption cores 224_2c, . . . , 224_Xc may include decryption circuits 224_21, . . . , 224_X1 and decryption key schedulers 224_22, . . . , 224_X2. The encryption circuits 222_21, . . . , 222_X1 and the encryption key schedulers 222_22, . . . , 222_X2 of the second to X-th encryption cores 222_2c, . . . , 222_Xc may perform operations same as the operations performed by the encryption/decryption circuits 220_21, . . . , 220_X1 and the encryption/decryption key schedulers 22022, . . . , 220_X2, respectively, of the second to X-th encryption/decryption cores 220_21, . . . , 220_X1 of FIG. 21 during the encryption operation. In addition, the decryption circuits 224_21, . . . , 224_X1 and the decryption key schedulers 224_22, . . . , 224_X2 of the second to X-th decryption cores 224_2c, . . . , 224_Xc may perform operations same as the operations performed by the encryption/decryption circuits 220_21, . . . , 220_X1 and the encryption/decryption key schedulers 220_22, . . . , 220_X2, respectively, of the second to X-th encryption/decryption cores 220_21, . . . , 220_X1 of FIG. 21 during the decryption operation.

Therefore, in the encryptor/decryptor 2700 of FIGS. 27A and 27B, the initialization result value I_Rst generated by the first encryption core 222_1c is shared by the plurality of encryption cores 222_1c, 222_2c, . . . , 222_Xc, and the initialization result value I_Rst generated by the first decryption core 224_1c is shared by the plurality of decryption cores 224_1c, 224_2c, . . . , 224_Xc. Also, the first decryption core 224_1c further includes an encryption key scheduler 222_12 that regenerates the N-th round key RKN used in the final round of the encryption operation, and transmits the N-th round key RKN to the second to X-th decryption cores 224_2c, . . . , 224_Xc so that the second to X-th decryption cores 224_2c, . . . , 224_Xc may not additionally perform operations for regenerating the N-th round key RKN. Therefore, according to the encryptor/decryptor 2700 having the full duplex structure, the encryption and decryption may be performed more rapidly, and the power consumption and the layout area may be reduced.

Figure 28:
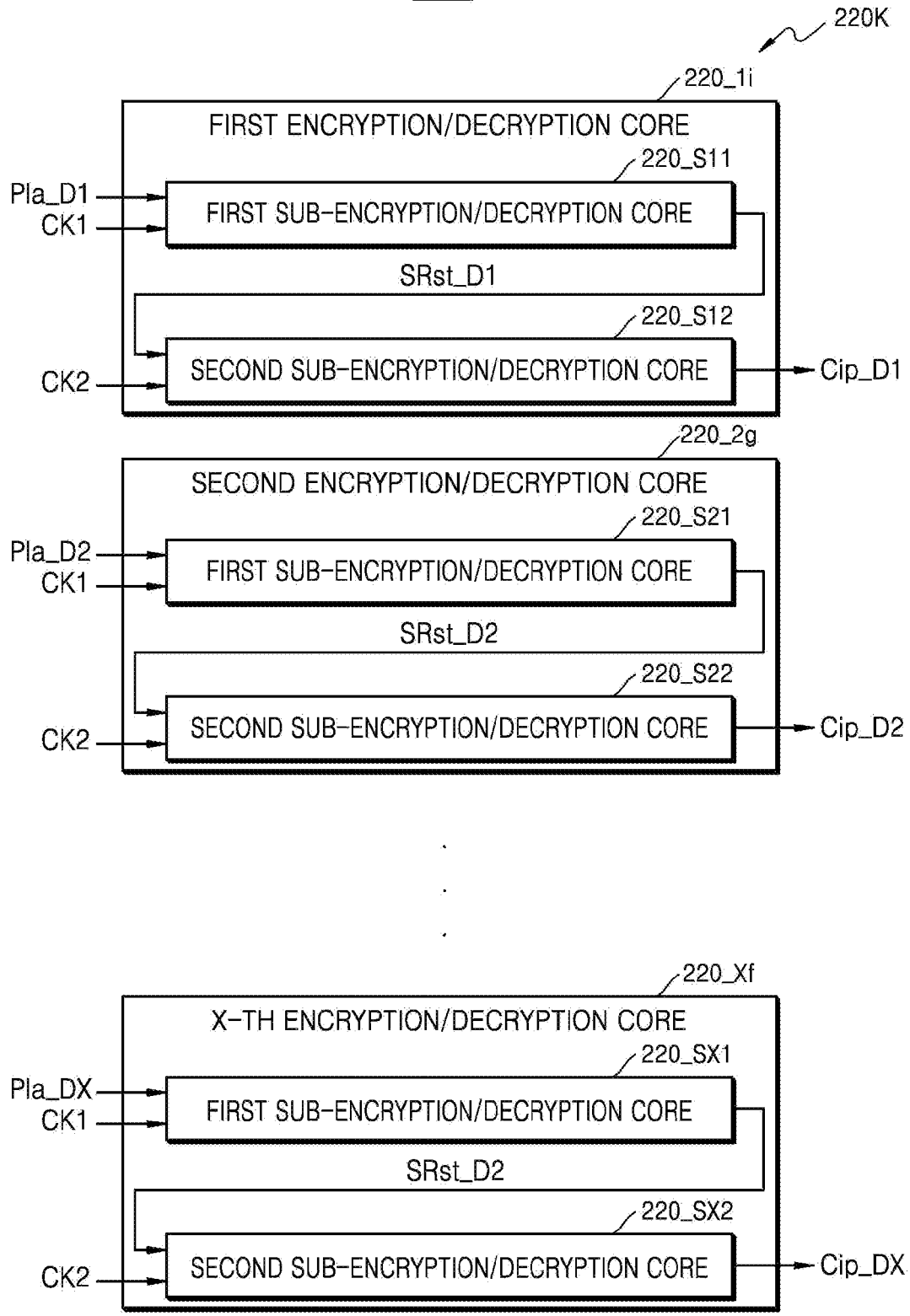
FIGS. 28 to 31 are diagrams of encryptors/decryptors according to one or more exemplary embodiments of the inventive concept.

FIG. 28 is a diagram of an encryptor/decryptor according to another exemplary embodiment of the inventive concept. In an encryptor/decryptor 2800 of FIG. 28, an encryption/decryption core module 200K includes a plurality of encryption/decryption cores 220_1i, 220_2g, . . . , 220_Xf. Each of the plurality of encryption/decryption cores 220_1i, 220_2g, . . . , 220_Xf may include at least two sub-encryption/decryption cores. For example, the first encryption/decryption core 220_1i includes a first sub-encryption/decryption core 220_S11 and a second sub-encryption/decryption core 220_S12, the second encryption/decryption core 220_2g includes a first sub-encryption/decryption core 220_S21 and a second sub-encryption/decryption core 220_S22, and the X-th encryption/decryption core 220_Xf includes a first sub-encryption/decryption core 220_SX1 and a second sub-encryption/decryption core 220_SX2.

The sub-encryption/decryption cores included in the same encryption/decryption core may perform the encryption and decryption in different manners from each other. For example, the first sub-encryption/decryption core 220_S11 of the first encryption/decryption core 220_1i may perform the encryption and decryption by using the AES algorithm, and the second sub-encryption/decryption core 220_S12 may perform the encryption and decryption by using an encryption algorithm other than the AES algorithm. Otherwise, the first sub-encryption/decryption core 220_S11 and the second sub-encryption/decryption core 220_S12 may perform the encryption and decryption by using the AES algorithm, while different cipher keys are used. For example, the first sub-encryption/decryption core 220_S11 of the first encryption/decryption core 220_1i may execute the AES algorithm by using a first cipher key CK1 having a value of {2b 7e 15 16 28 ae d2 a6 ab f7 15 88 09 cf 4f 3c} that is exemplarily shown in the algorithm 1 of FIG. 6, and the second sub-encryption/decryption core 220_S12 may execute the AES algorithm by using a second cipher key CK2 that is different from the first cipher key CK1.

However, the first sub-encryption/decryption cores 220_S11, 220_S21, 220_SX1 of the plurality of encryption/decryption cores 220_1i, 220_2g, . . . , 220_Xf use the same encryption/decryption manner as each other, and the second sub-encryption/decryption cores 220_S12, 220_S22, . . . , 220_SX2 may use the same encryption/decryption manner as each other. For example, the first sub-encryption/decryption cores 220_S11, 220_S21, . . . , 220_SX1 of the plurality of encryption/decryption cores 220_1i, 220_2g, . . . , 220_Xf may use the same first cipher key CK1, and the second sub-encryption/decryption cores 220_S12, 220_S22, . . . , 220_SX2 may use the same second cipher key CK2.

Sub-encryption/decryption results SRst_D1, SRst_D2, . . . , SRst_DX generated as results of encrypting the plaintext data Pla_D1, Pla_D2, . . . , Pla_Dx in the first sub-encryption/decryption core 220_S11, 220_S21, . . . , 220_SX1 are encrypted again by the second sub-encryption/decryption cores 220_S12, 220_S22, . . . , 220_SX2 to finally output the ciphertext data Cip_D1, Cip_D2, . . . , Cip_Dx. For example, if the first sub-encryption/decryption cores 220_S11, 220_S21, . . . , 220_SX1 and the second sub-encryption/decryption cores 220_S12, 220_S22, . . . , 220_SX2 perform the encryption and decryption by using the AES algorithm, the output from the final round of the first sub-encryption/decryption cores 220_S11, 220_S21, . . . , 220_SX1 may be input to a pre-round of the second sub-encryption/decryption cores 220_S12, 220_S22, . . . , 220_SX2. FIG. 28 shows the encryption operation for convenience of description, but the decryption operation may be performed in the same manner. This will be applied and described with reference to FIGS. 29 to 31 later.

In the encryptor/decryptor 2800, sub-encryption/decryption results SRst_D1, SRst_D2, . . . , SRst_DX performed in the first sub-encryption/decryption cores 220_S11, 220_S21, . . . , 220_SX1 may be directly input to the second sub-encryption/decryption cores 220_S12, 220_S22, . . . , 220_SX2 without being stored, and thus, a time and resource taken to perform the encryption and decryption may be reduced while improving strength of the encryption. For example, according to the encryptor/decryptor 2800 of FIG. 28, a time taken to store and read the sub-encryption/decryption results SRst_D1, SRst_D2, . . . , SRst_DX and a storage space may be reduced.

FIG. 28 shows an example in which each of the encryption/decryption cores includes two sub-encryption/decryption cores, but one or more exemplary embodiments are not limited thereto. That is, each of the encryption/decryption cores may include three or more sub-encryption/decryption cores. This may be applied to encryptor/decryptor of FIGS. 29 to 31.

Figure 29:
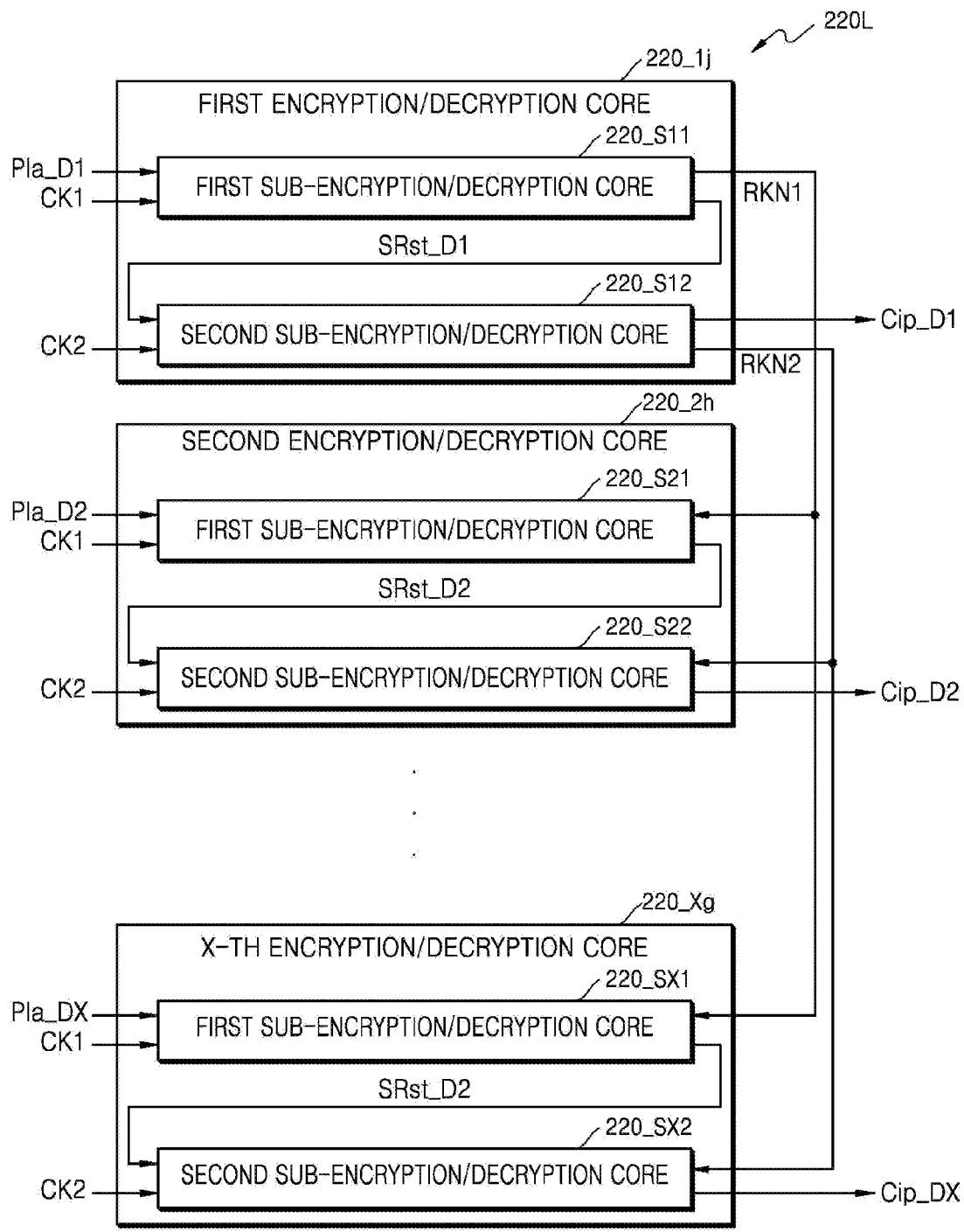
Figure 30:
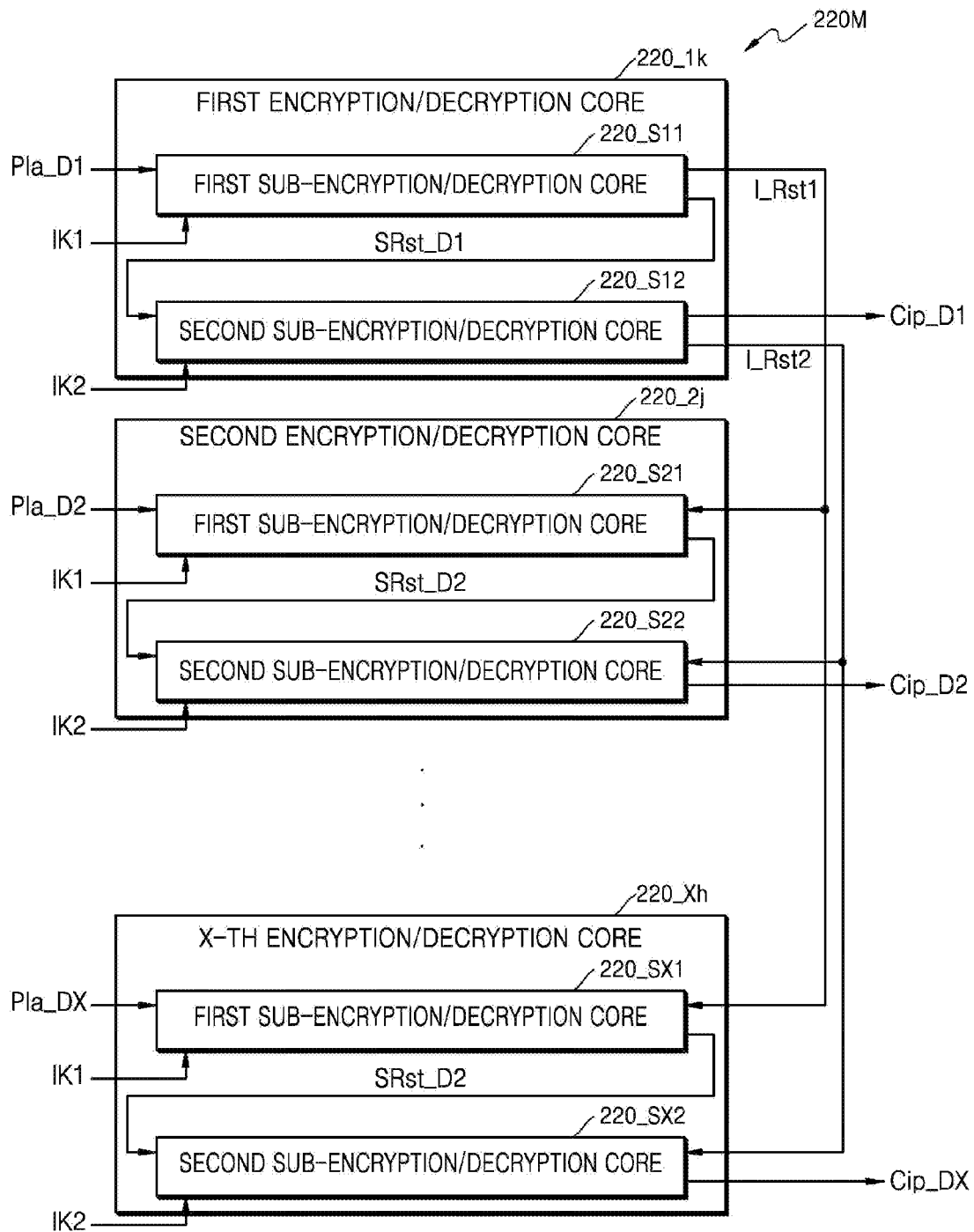
Figure 31:
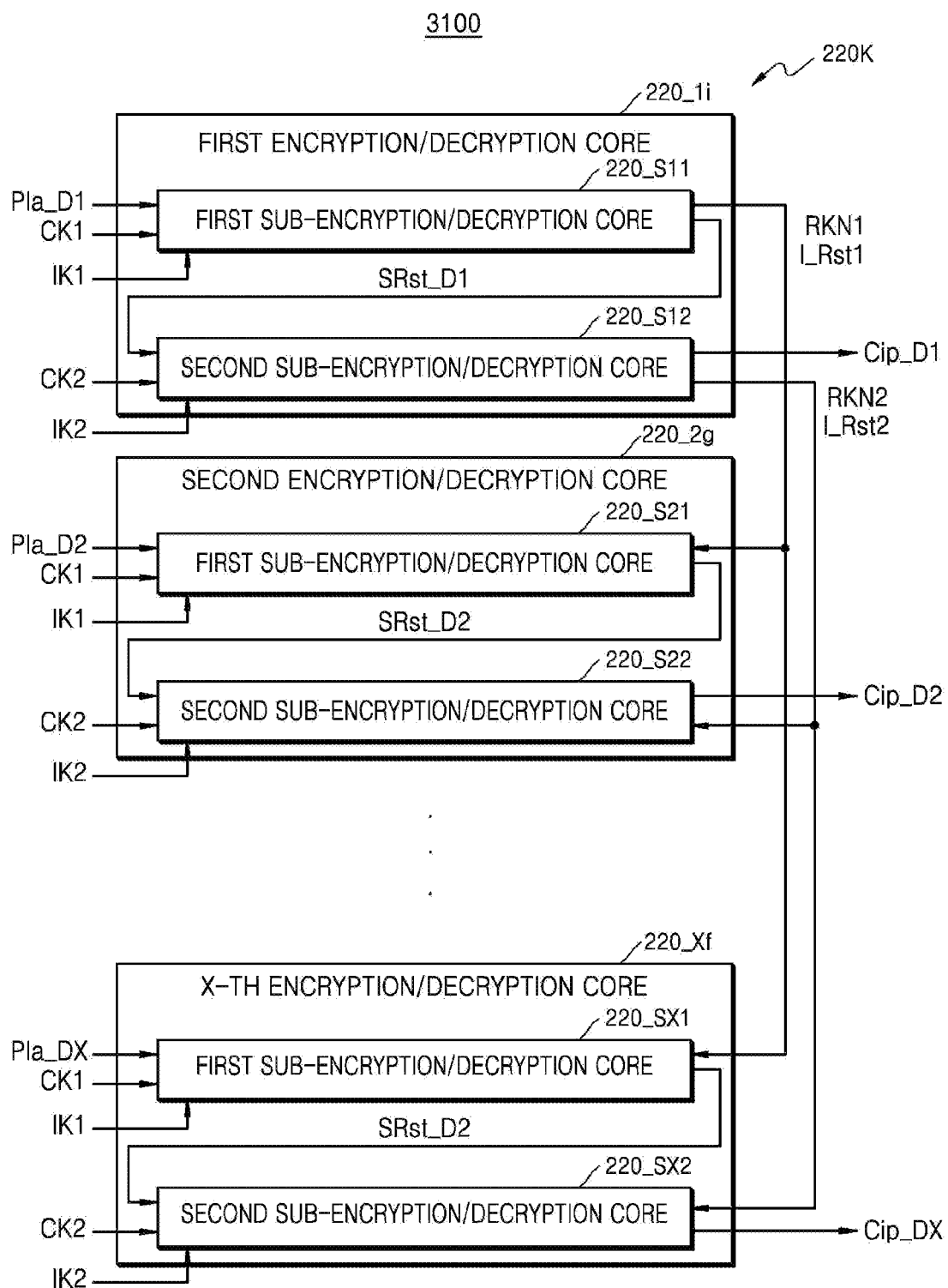

FIGS. 29 to 31 are diagrams of encryptor/decryptor according to one or more exemplary embodiments of the inventive concept. Referring to FIG. 29, in an encryptor/decryptor 2900, a plurality of encryption/decryption cores 220_1j, 220_2h, . . . , 220_Xg included in an encryption/decryption core module 200L may include first sub-encryption/decryption cores 220_S11, 220_S21, . . . , 220_SX1 and second sub-encryption/decryption cores 220_S12, 220_S22, . . . , 220_SX2, like the encryptor/decryptor 2800 of FIG. 28. The first sub-encryption/decryption core 220_S11, 220_S21, . . . , 220_SX1 and the second sub-encryption/decryption cores 220_S12, 220_S22, . . . , 220_SX2 of FIG. 29 may perform the encryption and decryption by using the AES algorithm. However, the first sub-encryption/decryption core 220_S11, 220_S21, . . . , 220_SX1 perform the encryption and decryption by using the first cipher key CK1, and the second sub-encryption/decryption core 220_S12, 220_S22, . . . , 220_SX2 perform the encryption and decryption by using the second cipher key CK2. The second cipher key CK2 may be different than the first cipher key CK1.

Moreover, according to the encryptor/decryptor 2900, the plurality of first sub-encryption/decryption cores 220_S11, 220_S21, . . . , 220_SX1 may perform the decryption by using an N-th round key RKN1 that is regenerated by the first sub-encryption/decryption core 220_S11 of the first encryption/decryption core 220_1j. In addition, the plurality of second sub-encryption/decryption cores 220_S12, 220_S22, . . . , 220_SX2 may perform the decryption by using an N-th round key RKN2 regenerated by the sub-encryption/decryption core 220_S21 of the first encryption/decryption core 220_1j.

In an encryptor/decryptor 3000 of FIG. 30, a plurality of encryption/decryption cores 220_1k, 220_2j, . . . , 220_Xh included in an encryption/decryption core module 200M may include first sub-encryption/decryption cores 220_S11, 220_S21, . . . , 220_SX1 and second sub-encryption/decryption cores 220_S12, 220_S22, . . . , 220_SX2, like the encryptor/decryptor 2800 of FIG. 28. The first sub-encryption/decryption cores 220_S11, 220_S21, . . . , 220_SX1 and the second sub-encryption/decryption cores 220_S12, 220_S22, . . . , 220_SX2 may perform the encryption and decryption by using the AES algorithm in the XTS mode. However, the first sub-encryption/decryption cores 220_S11, 220_S21, . . . , 220_SX1 perform the initialization operation of the XTS mode by using a first input key IK1 and the second sub-encryption/decryption cores 220_S12, 220_S22, . . . , 220_SX2 perform the initialization operation of the XTS mode by using a second input key IK2 that is different from the first input key IK1.

Moreover, the first sub-encryption/decryption cores 220_S11, 220_S21, . . . , 220_SX1 may perform the encryption or the decryption by using the initialization result value I_Rst generated by the first sub-encryption/decryption core 220_S11 of the first encryption/decryption core 220_1k, in the encryptor/decryptor 3000 of FIG. 30. Also, the plurality of second sub-encryption/decryption cores 220_S12, 220_S22, . . . , 220_SX2 may perform the encryption or the decryption by using an initialization result value I_Rst generated by the second sub-encryption/decryption core 220_S21 of the first encryption/decryption core 220_1k, in the encryptor/decryptor 3000 of FIG. 30.

In an encryptor/decryptor 3100 of FIG. 31, a plurality of encryption/decryption cores 220_11, 220_2k, . . . , 220_Xi of an encryption/decryption core module 200M may include first sub-encryption/decryption cores 220_S11, 220_S21, . . . , 220_SX1 and second sub-encryption/decryption cores 220_S12, 220_S22, . . . , 220_SX2, like the encryptor/decryptor 2800 of FIG. 28. The first sub-encryption/decryption cores 220_S11, 220_S21, . . . , 220_SX1 and the second sub-encryption/decryption cores 220_S12, 220_S22, . . . , 220_SX2 may perform the encryption and decryption by using the AES algorithm in the XTS mode. However, the first sub-encryption/decryption cores 220_S11, 220_S21, . . . , 220_SX1 may perform the initialization operation in the XTS mode and the encryption and decryption operation by using the first cipher key CK1 and the first input key IK1, and the second sub-encryption/decryption cores 220_S12, 220_S22, . . . , 220_SX2 may perform the initialization operation in the XTS mode and the encryption and decryption by using the second cipher key CK2 and the second input key IK2 that are respectively different from the first cipher key CK1 and the first input key IK1.

Moreover, according to the encryptor/decryptor 3100 of FIG. 31, the plurality of first sub-encryption/decryption cores 220_S11, 220_S21, . . . , 220_SX1 may perform the encryption and decryption by using the N-th round key RKN1 and the initialization result value I_Rst1 that are regenerated and generated by the first sub-encryption/decryption core 220_S11 of the first encryption/decryption core 220_11. Also, the plurality of second sub-encryption/decryption cores 220_S12, 220_S22, . . . , 220_SX2 may perform the encryption and decryption by using an N-th round key RKN2 and an initialization result value I_Rst2 that are regenerated or generated by the second sub-encryption/decryption core 220_S21 of the first encryption/decryption core 220_11.

Therefore, the encryptors/decryptors 2900, 3000, and 3100 of FIGS. 29 to 31 may save resources such as the electric power, the time, and the storage space while increasing the strength of encryption. Although not described in detail, in the encryptor/decryptor of the full duplex structure, each of the encryption core and the decryption core may include two or more sub-encryption cores or two or more sub-encryption cores. Also, the numbers of sub-encryption/decryption cores included in at least two encryption cores may be different from each other.

Figure 32:
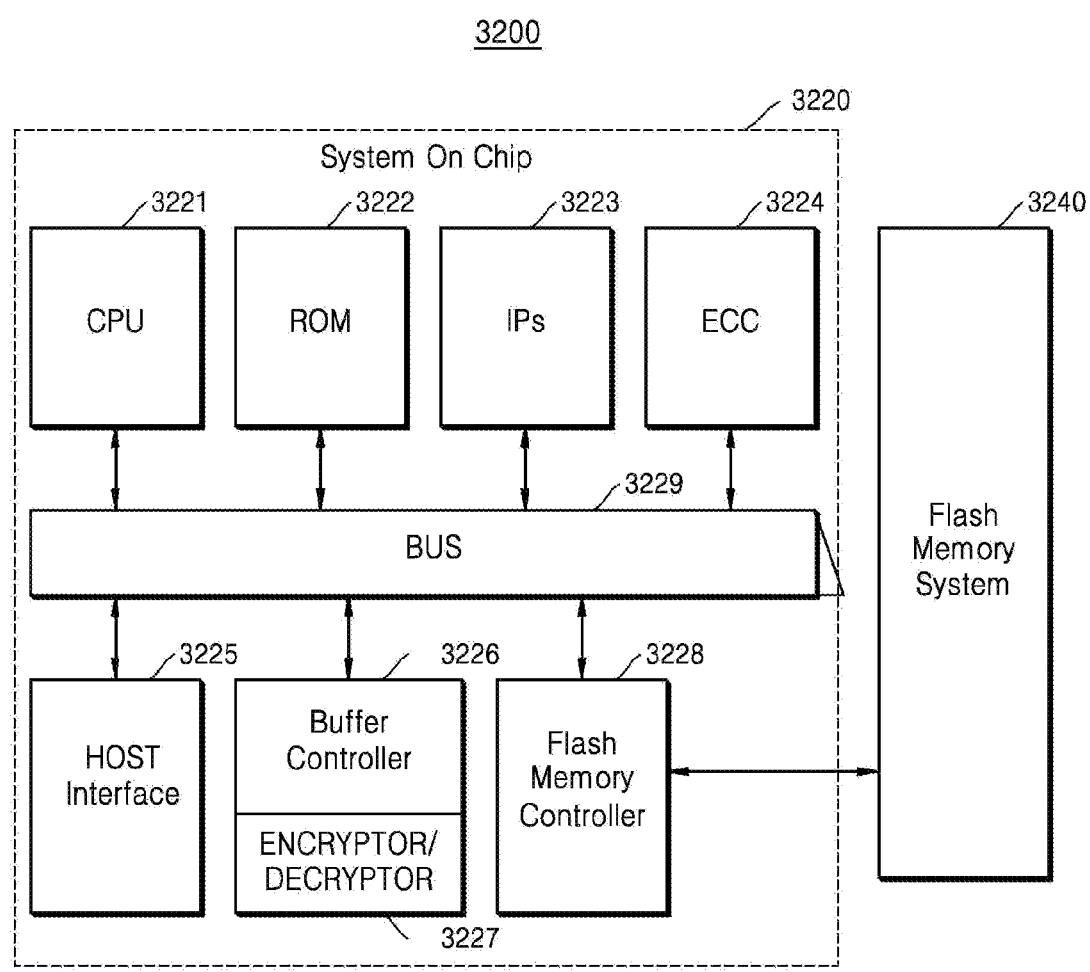
FIG. 32 is a diagram of an electronic device according to an exemplary embodiment of the inventive concept.

FIG. 32 is a diagram of an electronic device according to an exemplary embodiment of the inventive concept. Referring to FIG. 32, an electronic device 3200 includes a system on chip (SOC) 3220 and a flash memory system 3240 that may be electrically connected to the SOC 3220. The SOC 3220 includes a central processing unit (CPU) 3221 controlling execution of an application requested to the SOC 3220, a read only memory (ROM) 3222, from which data used for the CPU 3221 to perform the control operation is loaded, intellectual properties (IPs) 3223 performing functions for executing the application, an error check and correction (ECC) engine 3224 detecting and correcting an error of the data for executing the application, a host interface 3225 performing an interface with an external host, a buffer controller 3226 for controlling a buffer, in which the data for executing the application is temporarily stored, and a flash memory controller 3228 transmitting and receiving commands (including addresses) or data to/from the flash memory system 3240 that is electrically connected to the SOC 3220. The above elements are connected to each other via a bus 3229.

The SOC 3220 further includes an encryptor/decryptor 3227. The encryptor/decryptor 3227 may be included in the buffer controller 3226. The encryptor/decryptor 3227 may encrypt or decrypt the data used in the SOC 3220 to execute the application. The encryptor/decryptor 3227 may store the encrypted data in the flash memory system 3240 via the flash memory controller 3228, or may decrypt the data encrypted and stored in the flash memory system 3240 after receiving the data via the flash memory controller 3228 so as to allow the IPs 3223 to use the data. The encryptor/decryptor 3227 may the encryptor/decryptor described above with reference to FIG. 2. Therefore, the electronic device 3200 may perform the encryption or decryption efficiently with high speed.

Figure 33:
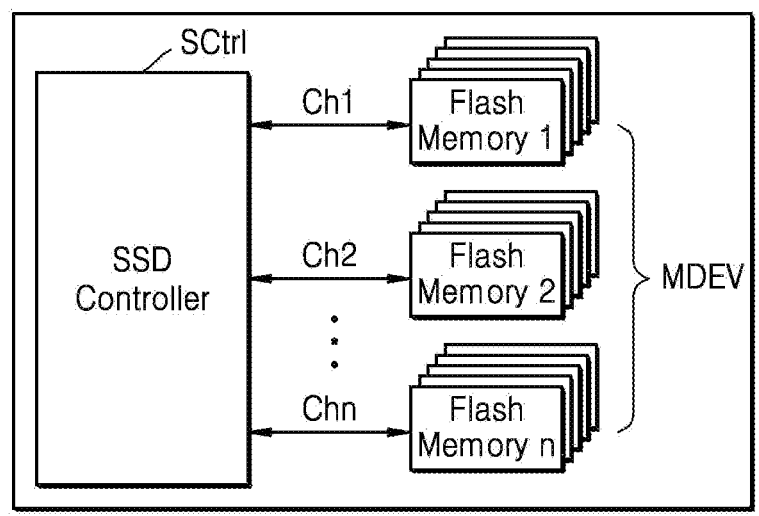
FIGS. 33 and 34 are diagrams of examples of a flash memory system of the electronic device shown in FIG. 32.

FIG. 33 shows an example of a solid state drive. The solid state drive may be the flash memory system 3240 that may be electrically connected to the SOC 3220. As shown in FIG. 33, a solid state drive (SSD) 3300 includes an SSD controller SCtrl and a plurality of flash memories MDEV. The SSD controller SCtrl is connected to the flash memories MDEV via a plurality of channels Ch1 to CHn to program the data input from the SOC 3220 in the flash memories MDEV, and controls, for example, reads the data requested by the SOC 3220 from the flash memories MDEV.

Figure 34:
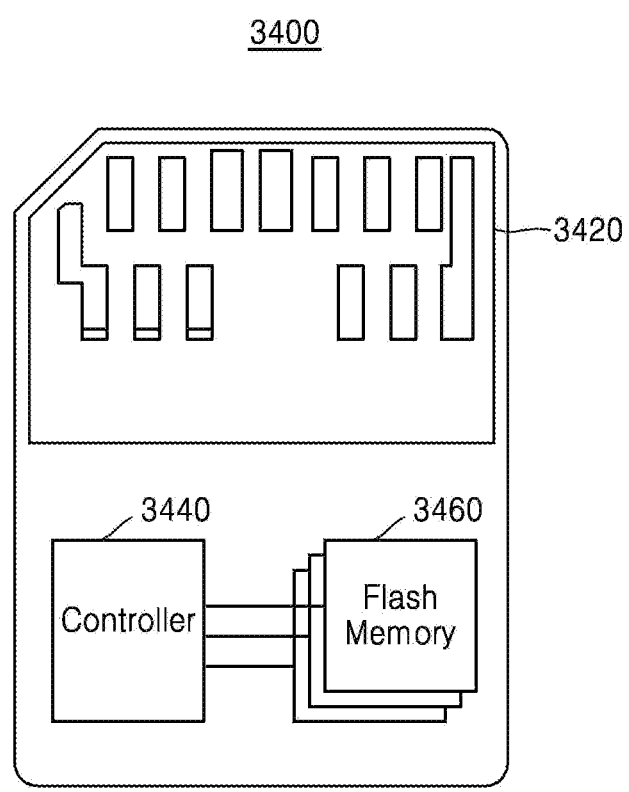

FIG. 34 shows an example of a memory card. The memory card may be the flash memory system 3240 that may be electrically connected to the SOC 3220. As shown in FIG. 34, a memory card 3400 may include a port region 3420, a controller 3440, and a flash memory 3460. The memory card 3400 may communicate with the SOC 3220 via the port region 3420. In addition, the controller 3440 programs the data input from the SOC 3220 in the flash memory 3460, and reads the data requested by the SOC 3220 from the flash memory 3460. The memory card 3400 may be realized in various types such as a secure digital (SD) card, an embedded multimedia memory card (eMMC), and a universal flash storage (UFS). However, in FIG. 34, the SD card, the eMMC, or the UFS is not particularly shown in FIG. 34.

Figure 35:
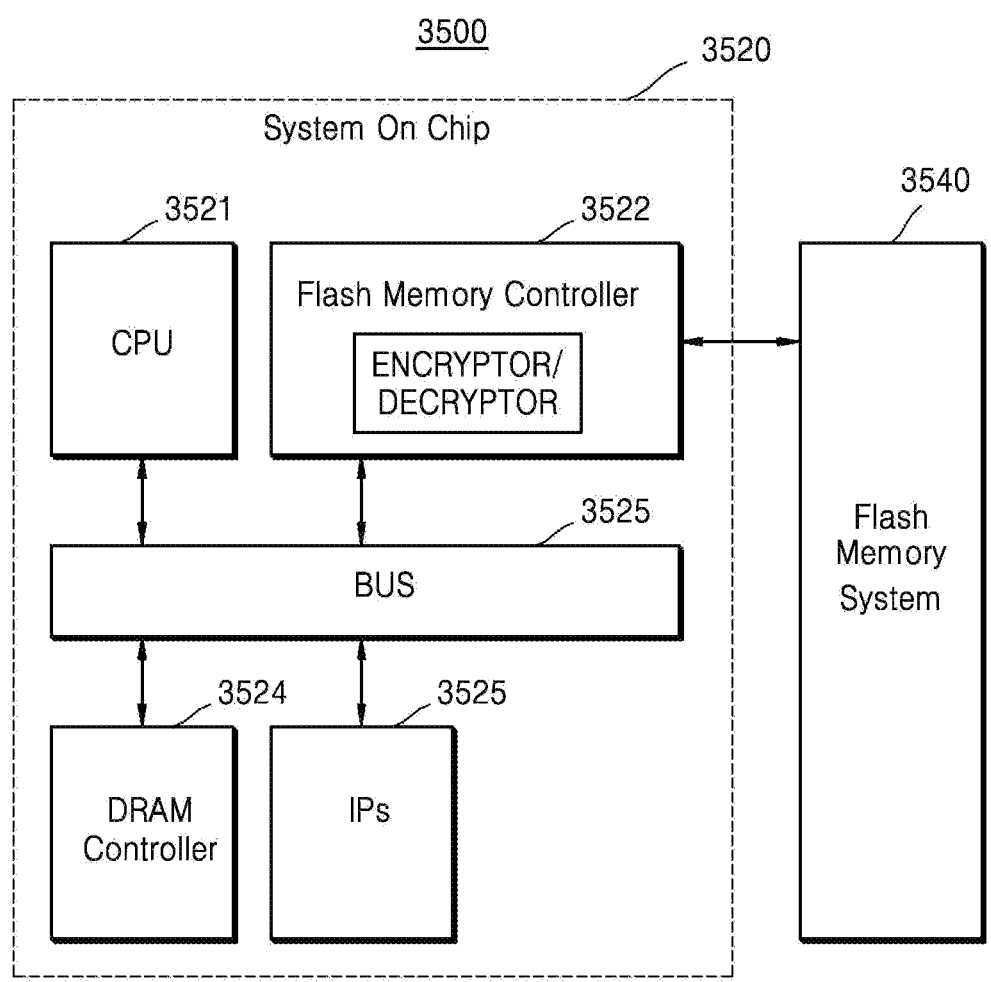
FIGS. 35 and 36 are diagrams of electronic devices according to one or more exemplary embodiments of the inventive concept.
Figure 36:
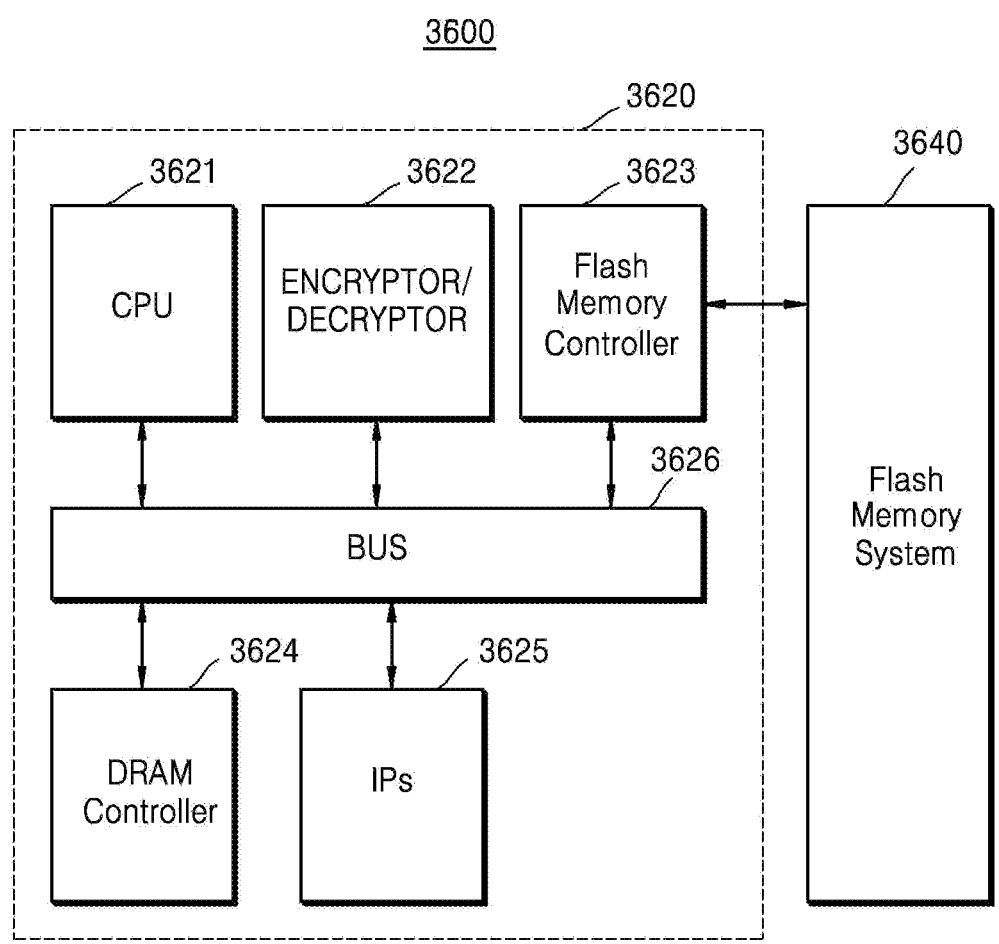

FIGS. 35 and 36 are diagrams showing electronic devices, according to one or more exemplary embodiments of the inventive concept. An electronic device 3500 of FIG. 35 includes an SOC 3520 and a flash memory system 3540 that may be electrically connected to the SOC 3520. The SOC 3520 of FIG. 35 includes a CPU 3521, a flash memory controller 3522, a dynamic random access memory (DRAM) controller 3524, and IPs 3525 that are connected to a bus 3526. The SOC 3520 of FIG. 35 may transmit/receive data to/from an external main memory via the DRAM controller 3524. The SOC 3520 may perform operations that are similar to or the same as the operations performed by the SOC 3220 of FIG. 32.

The SOC 3520 further includes an encryptor/decryptor 3523. The encryptor/decryptor 3523 may be included in the flash memory controller 3522. The encryptor/decryptor 3523 may encrypt or decrypt data used to execute an application in the SOC 3520. Since the encryptor/decryptor 3523 is included in the flash memory controller 3522, the encrypted data may be directly stored in the flash memory system 3540 or the data encrypted and stored in the flash memory system 3540 may be directly decrypted without using the bus 3526.

However, as shown in an electronic device 3600 of FIG. 36, the encryptor/decryptor 3622 may be provided at an outside of the flash memory controller 3623. It should be noted that other elements of FIG. 36 are similar to those of FIG. 35 even though their reference designators are denoted 36xx, and thus repeated description will not be provided. The encryptor/decryptor 3622 may be one of the encryptors/decryptors described above with reference to FIG. 2 and other drawings. Therefore, the electronic device 3500 or 3600 may perform the encryption and decryption efficiently with high speed. The SOC described above may be formed as an application processor that may be included in a mobile device.

While the inventive concept has been particularly shown and described with reference to exemplary embodiments thereof, it will be understood that various changes in form and details may be made therein without departing from the spirit and scope of the following claims.

What is claimed is:

1. A method of operating an encryptor/decryptor, the method comprising:
   distributing an input plaintext stream to a plurality of encryption/decryption cores by pieces of plaintext data, each of the plurality of encryption/decryption cores comprising an encryption/decryption circuit;
   performing a first key generation operation in a first encryption/decryption core from among the plurality of encryption/decryption cores; and
   encrypting the plaintext data to ciphertext data or decrypting the ciphertext data to the plaintext data by the encryption/decryption circuit of each encryption/decryption core of the plurality of encryption/decryption cores by using a cipher key that is a result of performing the first key generation operation.

2. The method of claim 1, wherein the performing of the first key generation operation comprises, when the plaintext data is encrypted into the ciphertext data through a plurality of rounds of a block cipher algorithm, regenerating an N-th round key that is used in an N-th round to output the ciphertext data from among the plurality of rounds, in response to a request to the encryptor/decryptor to decrypt the ciphertext data.

3. The method of claim 2, wherein the encrypting or decrypting in each of the plurality of encryption/decryption cores comprises performing decryption according to the block cipher algorithm in the plurality of encryption/decryption cores by using the N-th round key regenerated by the first encryption/decryption core.

4. The method of claim 2, wherein the performing of the first key generation operation further comprises generating an initialization result value for changing the plaintext data in an XOR-encrypt-XOR (XEX)-based tweaked-codebook mode with ciphertext stream (XTS) mode,
wherein the encrypting comprises performing encryption according to the block cipher algorithm by using an exclusive OR result of the initialization result value and the plaintext data, in each of the plurality of encryption/decryption cores.

5. The method of claim 2, further comprising performing a second operation in a second encryption/decryption core from among the plurality of encryption/decryption cores, and
wherein the encrypting or decrypting by the plurality of encryption/decryption cores is performed by using a result of the second operation, with the result of the first key generation operation.

6. The method of claim 5, wherein the performing the second operation comprises generating an initialization result value for changing the plaintext data in an XTS mode.

7. The method of claim 1, further comprising encrypting the plaintext data into the ciphertext data by performing calculations through first to N-th rounds sequentially according to a block cipher algorithm in each of the plurality of encryption/decryption cores, in response to a request transmitted to the encryptor/decryptor for encryption of the input plaintext stream, and
wherein the performing the first key generation operation comprises generating and storing an N-th round key by the first encryption/decryption core for performing the calculations.

8. The method of claim 7, wherein the decrypting comprises performing decryption in the plurality of encryption/decryption cores by using the N-th round key stored in the first encryption/decryption core, in response to a request sent to the encryptor/decryptor for decryption of the ciphertext data.

9. The method of claim 7, wherein the encrypting or decrypting by the plurality of encryption/decryption cores comprises:
   identifying whether a cipher key corresponding to the N-th round key is changed by the first encryption/decryption core, in response to a request sent to the encryptor/decryptor for decryption of the ciphertext data;
   if the cipher key is not changed, performing the decryption in the plurality of encryption/decryption cores by using the N-th round key stored in the first encryption/decryption core; and
   if the cipher key has changed, regenerating an N-th round key in the first encryption/decryption core and performing the decryption in the plurality of encryption/decryption cores by using the N-th round key that has been regenerated.

10. The method of claim 1, wherein:
the performing of the first key generation operation comprises generating an initialization result value for changing the plaintext data in an XTS mode, and
the encrypting comprises performing encryption in each of the plurality of encryption/decryption cores sequentially according to a block cipher algorithm, by using a result obtained from an exclusive OR operation of the initialization result value and the plaintext data.

11. The method of claim 1, wherein:
each of the plurality of encryption/decryption cores comprises an encryption core for encrypting the plaintext data into the ciphertext data and a decryption core, provided separately from the encryption core, for decrypting the ciphertext data into the plaintext data, and the first key generation operation comprises an operation, in which the decryption core of the first encryption/decryption core generates an N-th round key used in an N-th round for outputting the ciphertext data from among a plurality of rounds according to a block cipher algorithm, in response to a request to the encryptor/decryptor to decrypt ciphertext data.

12. The method of claim 11, wherein the decrypting comprises performing decryption in the decryption core in each of the plurality of encryption/decryption cores by using the N-th round key generated by the decryption core of the first encryption/decryption core.

13. The method of claim 11, further comprising encrypting the plaintext data into the ciphertext data in the encryption core in each of the plurality of encryption/decryption cores by performing calculations in first to N-th rounds according to the block cipher algorithm, in response to a request to the encryptor/decryptor to encrypt the input plaintext stream,
wherein the performing of the first key generation operation comprises the encryption core of the first encryption/decryption core generating and storing the N-th round key in order to perform a calculation in an N-th round.

14. The method of claim 13, wherein the decrypting comprises performing decryption in the decryption core in each of the plurality of encryption/decryption cores by using the N-th round key stored by the encryption core of the first encryption/decryption core, in response to a request to the encryptor/decryptor to decrypt the ciphertext data.

15. The method of claim 1, wherein each of the plurality of encryption/decryption cores comprises a first sub-encryption/decryption core and a second sub-encryption/decryption core, and
the first sub-encryption/decryption core performs encryption or decryption in a first manner,
the second sub-encryption/decryption core performs encryption or decryption in a second manner different from the first manner, and
the performing the first key generation operation comprises regenerating an N-th round key by the first sub-encryption/decryption core and regenerating an N-th round key by the second sub-encryption/decryption core of the first encryption/decryption core, in response to a request to the encryptor/decryptor to decrypt the ciphertext data sent to the encryptor/decryptor.

16. The method of claim 15, wherein the decrypting in the plurality of encryption/decryption cores comprises:
performing the decryption by the first sub-encryption/decryption core in each of the plurality of encryption/decryption cores by using the N-th round key that is regenerated by the first sub-encryption/decryption core of the first encryption/decryption core; and
performing the decryption by the second sub-encryption/decryption core in each of the plurality of encryption/decryption cores by using the N-th round key that is regenerated by the second sub-encryption/decryption core of the first encryption/decryption core.

17. The method of claim 15, wherein the first sub-encryption/decryption core in each of the plurality of encryption/decryption cores encrypts the plaintext data or decrypts the ciphertext data according to an advanced encryption standard (AES) algorithm by using a first cipher key, and the second sub-encryption/decryption core in each of the plurality of encryption/decryption cores encrypts an encrypted result of the second sub-encryption/decryption core into the ciphertext data or decrypts the encrypted result to the plaintext data according to the AES algorithm by using a second cipher key that is different from the first cipher key.

18. The method of claim 1, wherein the performing of the first key generation operation comprises encrypting the ciphertext data through N rounds of a block cipher algorithm, the cipher key is an N-th round key that is used in an N-th round to output the ciphertext data from among a plurality of rounds.

19. An encryptor/decryptor comprising:
a plurality of encryption/decryption cores, each encryption/decryption core comprising a encryption/decryption circuit, the plurality of encryption/decryption cores performing encryption or decryption through a plurality of rounds according to a block cipher algorithm; and
a first data processor that distributes an input plaintext stream to the plurality of encryption/decryption cores by pieces of plaintext data,
wherein a first encryption/decryption core from among the plurality of encryption/decryption cores performs a first key generation operation, and the encryption/decryption circuit of each of the plurality of encryption/decryption cores encrypts the plaintext data to ciphertext data or decrypts the ciphertext data to the plaintext data by using a cypher key that is a result of the first key generation operation.

20. The encryptor/decryptor of claim 19, wherein the first key generation operation comprises an operation in which the first encryption/decryption core regenerates an N-th round key that is used in an N-th round of outputting the ciphertext data from among the plurality of rounds according to the block cipher algorithm.

21. The encryptor/decryptor of claim 20, wherein the plurality of encryption/decryption cores perform decryption according to the block cipher algorithm by using the N-th round key regenerated by the first encryption/decryption core.

* * * * *